(12) United States Patent
Dodds

(10) Patent No.: US 10,435,107 B2
(45) Date of Patent: Oct. 8, 2019

(54) POLE PROPELLED VELOCIPEDE

(71) Applicant: Robert B. Dodds, Los Gatos, CA (US)

(72) Inventor: Robert B. Dodds, Los Gatos, CA (US)

( * ) Notice: Subject to any disclaimer, the term of this patent is extended or adjusted under 35 U.S.C. 154(b) by 141 days.

(21) Appl. No.: 15/179,480

(22) Filed: Jun. 10, 2016

(65) Prior Publication Data

US 2016/0280319 A1    Sep. 29, 2016

Related U.S. Application Data

(63) Continuation-in-part of application No. 15/074,114, filed on Mar. 18, 2016, now Pat. No. 10,167,045, which is a continuation of application No. 14/208,552, filed on Mar. 13, 2014, now Pat. No. 9,321,507.

(60) Provisional application No. 61/792,921, filed on Mar. 15, 2013.

(51) Int. Cl.

| | |
|---|---|
| *B62M 1/14* | (2006.01) |
| *B62K 3/10* | (2006.01) |
| *A63B 69/18* | (2006.01) |
| *B62L 3/04* | (2006.01) |
| *B62M 29/02* | (2006.01) |
| *B62K 1/00* | (2006.01) |
| *B62K 17/00* | (2006.01) |
| *B62M 1/12* | (2006.01) |
| *B62K 21/02* | (2006.01) |

(52) U.S. Cl.
CPC .............. *B62M 1/14* (2013.01); *A63B 69/18* (2013.01); *B62K 1/00* (2013.01); *B62K 3/10* (2013.01); *B62K 17/00* (2013.01); *B62L 3/04* (2013.01); *B62M 1/12* (2013.01); *B62M 29/02* (2013.01); *B62K 21/02* (2013.01)

(58) Field of Classification Search
CPC ... B62H 7/00; B62K 1/00; B62K 3/00; B62K 3/02; B62K 5/05; B62K 17/00
See application file for complete search history.

(56) References Cited

U.S. PATENT DOCUMENTS

| | | |
|---|---|---|
| 679,688 A | 7/1901 | Small |
| 958,618 A | 5/1910 | Franklin |
| 1,052,772 A | 2/1913 | Hegel |
| 1,313,157 A | 8/1919 | Amey |
| 1,425,220 A | 8/1922 | Seagrave |
| 1,619,668 A | 3/1927 | Gordon |

(Continued)

FOREIGN PATENT DOCUMENTS

| | | |
|---|---|---|
| BE | 1018142 A3 | 6/2010 |
| CN | 101372255 A | 2/2009 |

(Continued)

OTHER PUBLICATIONS

Office Action dated Apr. 12, 2018 for U.S. Appl. No. 15/074,114.

(Continued)

*Primary Examiner* — Jacob D Knutson
(74) *Attorney, Agent, or Firm* — MLO, a professional corp.

(57) ABSTRACT

A two wheeled vehicle is propelled by the feet of a rider and hand-grasped poles when pushing against the ground. A forward wheel on a forward member and a rear wheel on a rearward member align along a longitudinal axis. The forward member rotates about a vertical steering axis. A saddle supports the rider. A torso brace allows the rider to balance and steer the device.

18 Claims, 9 Drawing Sheets

(56) References Cited

U.S. PATENT DOCUMENTS

| | | | |
|---|---|---|---|
| 2,005,910 A | 4/1934 | Andersen | |
| 2,216,982 A | 5/1939 | Ollagnon | |
| 2,545,543 A | 3/1951 | Bottrill | |
| 33,103,319 | 3/1967 | Collins | |
| 3,389,922 A | 6/1968 | Eastin | |
| 3,860,264 A * | 1/1975 | Douglas | B62K 5/02 280/266 |
| 4,524,876 A | 6/1985 | Kusz | |
| 4,524,987 A | 6/1985 | Kim | |
| 4,657,579 A | 4/1987 | Davenport | |
| 4,863,182 A * | 9/1989 | Chern | A63C 17/006 280/266 |
| 5,098,087 A | 3/1992 | Matile | |
| 5,125,687 A | 6/1992 | Hwang | |
| 5,160,155 A | 11/1992 | Berachet | |
| 5,335,927 A | 8/1994 | Islas | |
| 5,454,579 A | 10/1995 | Chen | |
| 5,601,299 A | 2/1997 | Yun | |
| 5,732,964 A * | 3/1998 | Durham | A61H 3/04 135/67 |
| 5,868,413 A * | 2/1999 | Cabrera | B62H 7/00 280/205 |
| 5,979,922 A | 11/1999 | Becker et al. | |
| 6,488,295 B1 | 12/2002 | Bryant | |
| 6,659,488 B1 | 12/2003 | Beresnitzky et al. | |
| 7,537,229 B1 * | 5/2009 | Wu | B62H 1/12 280/205 |
| 7,798,510 B2 * | 9/2010 | Comstock | B62K 5/02 280/235 |
| 2002/0047245 A1 | 4/2002 | Green, Jr. et al. | |
| 2008/0220947 A1 | 9/2008 | Meng | |
| 2009/0224524 A1 | 9/2009 | Rathsack | |
| 2010/0237582 A1 | 9/2010 | Belenkov et al. | |
| 2011/0181014 A1 | 7/2011 | Ryan et al. | |
| 2011/0248466 A1 | 10/2011 | Leslie | |
| 2011/0248467 A1 | 10/2011 | Ball et al. | |
| 2012/0280468 A1 * | 11/2012 | Garcia | B62J 6/02 280/274 |
| 2013/0056949 A1 | 3/2013 | Bricker et al. | |
| 2013/0075996 A1 | 3/2013 | Armbruster | |
| 2013/0277941 A1 * | 10/2013 | Ryan | B62K 15/006 280/278 |
| 2014/0346752 A1 | 11/2014 | Rasmussen | |

FOREIGN PATENT DOCUMENTS

| | | |
|---|---|---|
| CN | 201907606 U | 7/2011 |
| CN | 102514674 A | 6/2012 |
| DE | 4321558 A1 | 5/1994 |
| FR | 2335393 A1 | 7/1977 |
| KR | 20-0363709 Y1 | 10/2004 |
| WO | 9325288 | 12/1993 |

OTHER PUBLICATIONS

Sharp, Archibald, Bicycles and Tricycles: An Elementary Treatise on Their Design and Construction, 2003, Section 162. Balancing on a Bicycle, Dover press, an unabridged republication.

Sharp, Archibald, Bicycles and Tricycles: An Elementary Treatise on Their Design and Construction, 2003, Section 179. Steering Without Hands, Dover press, an unabridged republication.

Wilson, David Gordon, contribution by Papadopoulos, Jim, Bicycling Science, 3rd Edition, 2004, pp. 263-290, Chapter 8, Massachusetts Institute of Technology.

Wilson, David Gordon, contribution by Papadopoulos, Jim, Bicycling Science, 3rd Edition, 2004, pp. 300-309, Chapter 8, Massachusetts Institute of Technology.

Office Action dated May 7, 2018 for EPO Patent Application No. 14 770 636.0-1013.

* cited by examiner

POLE PROPELLED VELOCIPEDE

CROSS-REFERENCE TO RELATED APPLICATIONS

This application is a continuation-in-part of co-pending U.S. patent application Ser. No. 15/074,114, filed Mar. 18, 2016, which is a continuation of U.S. patent application Ser. No. 14/208,552, filed Mar. 13, 2014, now U.S. Pat. No. 9,321,507 B2, issued Apr. 26, 2016, which claims the benefits of U.S. Provisional Application No. 61/792,921 filed Mar. 15, 2013, the disclosures of which are hereby incorporated by reference in their entirety including all figures, tables, and drawings.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILED VIA THE OFFICE ELECTRONIC FILING SYSTEM (EFS-WEB)

Not applicable.

STATEMENT REGARDING PRIOR DISCLOSURE BY THE INVENTOR OR A JOINT INVENTOR

Not applicable.

BACKGROUND OF THE INVENTION

The invention is a velocipede—defined as a lightweight wheeled vehicle propelled by the rider—in combination with a pair of hand-grasped poles by which it is propelled. The vehicle has just two wheels, each are aligned one following the other, referred to herein as two-wheel tandem. The bicycle and the scooter are examples of a two-wheel tandem vehicle that appear very different, however both have the essential "two-wheeler" configuration that is commonly believed to include a handlebar. In the invention the riders' hands are totally engaged with the poles, and do not come in contact with the vehicle at all; and therefor surprisingly, the vehicle is a two-wheeler without a handlebar. Poles on the other hand, have been suggested before as a means of propulsion in a lightweight wheeled vehicle.

Poles which have traditionally been used with skis are also used for balance and propulsion of skis to which wheels have been added to navigate hard surfaces (U.S. Pat. Nos. 2,545,543; and 3,389,922). Poles have been provided to the users of roller skates for control, balance, and thrust (see, for example, WO 932588 and U.S. Pat. No. 5,601,299). Wheeled vehicles that allow the user to stand, sit, or kneel can be propelled by poles. Poles used like oars can propel such a vehicle (U.S. Pat. Nos. 1,313,157; 1,425,220; 1,619,668; and 2,216,982). A single (U.S. Pat. Nos. 1,052,722; and 2,005,910) or multiple poles (U.S. Pat. Nos. 3,310,319; and 5,098,087) can also be used that are independent from the vehicle for propulsion as well as brakes on coasting vehicles. While some of these devices are designed to assist the movement of paraplegics, most of the subject devices are intended for recreational use and to have fun.

Hwang, U.S. Pat. No. 5,125,687, described a rollerboard for road-skiing. The rollerboard has a rear wheel along a longitudinal line of the board, a front caster and subsidiary rollers to stabilize the platform. The user can either stand or sit on the platform. Poles are used to change direction of the board. Chem, U.S. Pat. No. 4,863,182, attached a skate to a unicycle to create a sporting device that could be used traditionally as a unicycle by pedaling or as an ice or grass scooter with poles to facilitate the sliding movement. A variety of vehicles in a variety of configurations to include two, three, four and more wheels have been designed for use with poles, however, a two-wheel tandem vehicle does not appear among them.

In spite of the poles and lack of handlebars, the present invention still must conform to those same configurational requirements which all two-wheelers have in common, the ones that make it possible for a person to balance upon a moving frame supported by just two wheels on the road. Steering a two-wheel tandem vehicle is part of an active process by which the rider maintains their balance on the vehicle. And as such, the vital function of controlling the steering wheel by the use of the rider's upper limbs, that is so integral to this process, must now be accomplished by some other method, which the invention does by the following scheme: The lower half of the rider's body is used to perform those functions which the upper half traditionally did by the use of handlebars, that is, stabilize the rider on the vehicle and steer its forward wheel; so then the upper half of the body is free to be used to propel the vehicle, which is what the lower half normally did.

Although hands-free steering of a two-wheeler may have been thought theoretically possible, such means or method has not heretofore proved to be feasible. Barachet's (U.S. Pat. No. 5,160,155) proposed "Skateboard Having Two Wheels in Tandem" with its caster-mounted (where the wheel's point-of-contract with the road is aft of the steering axis) forward wheel may be such an attempt. Bryant, U.S. Pat. No. 6,488,295, also proposed a way that a two-wheeler might be modified to enable it to be operated hands-free. Other experts, those skilled in the art, may offer their opinions—yet none can be found that would declare that it is not possible—nevertheless, as far as can be determined by this inventor, it has not before now been successfully demonstrated.

In the year 1896, some twenty years or so into the development of the modern bicycle, Bicycles & Tricycles was published in England and became the foremost authoritative reference source on the design of the bicycle. Archibald Sharp, the author, analyzed every aspect of bicycle design, including the phenomenon of riding one without holding the handlebar. Economy of words, regarded as an attribute in writing during that period, can make Sharp's explanation on "Steering Without Hands" difficult to follow; however it does appear, the knowledge and understanding of the two-wheel tandem vehicle, as it pertains to the present invention, has not advanced since then.

Sharp presents four pages of analysis with diagrams and equations that take into account the factors involved with steering a bicycle without the use of the hands. Sharp assumes a rider can maintain equilibrium without touching the handlebar provided torque at the steering axis stays balanced; and therefore, forces acting on the front wheel and frame, which may tend to turn it about the steering axis, must be controlled by the rider. Sharp recognizes two such forces which can cause various moments about the steering axis that tend to cause the position of the front wheel to deviate from its mid-position (front and rear wheels heading in the same direction) whenever the vehicle is tilted. One moment is due to the wheel's point-of-contract with the road being out of alignment with that plane which includes the rear wheels' point-of-contact and the steering axis. The force that is associated with this "first moment" is a reaction to that weight which bears on the front wheel.

A "second moment" is due to the center-of-mass—of that weight which pivots about the steering axis itself—being offset from the steering axis. The force associated with said second moment is caused by the pull-of-gravity on this mass, which includes the weight of the front wheel, fork, and anything else attached thereto, like a handlebar for instance. The two moments tend to act in the same direction. A "third moment", which opposes or counter-balances the other two, is produced by centripetal force at the front wheel's point-of-contract with the road, and is a reaction to the turning motion of the vehicle as it is being ridden. The centripetal force so generated is at right angle to the direction of travel; and hence at any given moment in time, this force is along the radius of the turn and in a direction pointing into the center of the turn.

Sharp derives an analytical expression for each of the three moments which take into account those factors mentioned above. According to Sharp: "To maintain equilibrium the [summation of the analytical expressions for the three moments] should have the value zero, to steer further to one side or other it should have a small positive value, and to steer straighter a small negative value." Sharp then points out: "For given values of speed and steering angle, there remains an element, the inclination of the rear-frame, at the command of the rider; but even with a skilled rider the above moment varies probably so quickly that he could not adjust the inclination quickly enough to preserve equilibrium." It appears Sharp had little confidence that the factors in this part of his analysis explained the feasibility of riding a bicycle without using the handlebar.

The 1890's were the golden age of bicycle design. Sharp and a handful of other highly regarded bicycle experts of the time—most notable, Sharp's prominent French contemporary M. Bourlet—spent a great deal of effort attempting to explain the secret of the two-wheel tandem vehicle. Agreement was never reached regarding the "no-hands" phenomenon. And over the following century little if any improvement in the bicycle's basic design, or advancement in understanding, were made. In 1977 the MIT Press republished Sharp's Treatise, and in the foreword David Gordon Wilson, professor of mechanical engineering at the school, says this "definitive work . . . marked, and helped to bring about, the end of an exciting period in mechanical engineering . . . and was almost the last book as well as the last word on bicycle design."

In today's modern era, those skilled in the art still hold the prevailing opinion from that earlier period. In U.S. Pat. No. 6,488,295 Bryant states: "Particularly skilled riders can maintain stable, dynamic balance of traditional bicycles traveling straight without holding the handlebars. In such cases, they may even be able to turn their bicycles left or right simply by leaning their body and tilting the vehicle. However, minor transient disturbances, such as those associated with riding on an uneven or rough road surface, or the rider needing to change speed or steering directions, quickly destabilize the vehicle". Bryant asserts: "for any given two-wheeled vehicle, there is a controllable operating envelope of speeds and turn radii for a given terrain in which the rider's ability to simply tilt the vehicle in one direction or the other is sufficient to correct dynamic instabilities arising during operation of the vehicle", but because that "envelope is much smaller than desired . . . traditional two-wheeled vehicles are hand-steered". Bryant believes that he knows a way to correct this condition and thereby eliminate the need for handlebars.

Bryant's apparent revelation: "A previously unrecognized, but major factor in two-wheeled vehicle stability is the un-stabilizing force associated with the point-of-contact of the steering wheel, which is pivotally secured to the vehicle along the steering axis, being spaced too far away from the vehicle plane, defined as the plane that includes the rear wheel's point-of-contact and the steering axis, when the steering wheel is turned" is of course the very same force recognized by Sharp and presented in his 1896 Treatise, as cited herein, and that being the cause of said "first moment" referred to above. And like Sharp before him, Bryant realizes that this "major factor" can generate torque about the steering axis. Bryant does not, however, recognize Sharp's "second moment" which can also cause torque about the steering axis.

Bryant does not attempt to improve the hands-free handling capability of the bicycle in general. Bryant's objective is to take a given two-wheeled vehicle and make it stable and controllable within an "operational envelope"—and eliminate the necessity for a handlebar—by incorporating a "dynamic control regulator" which, by mechanical means, can vary the geometry of the vehicle as a function of its tilt and steering angle. Bryant's proposes several designs for such a vehicle where "the rider stands on a substantially planar standing surface in the same manner as a rider of a surfboard, snowboard, or skateboard" and steers by leaning their body in the same hands-free manner.

Interestingly, in his discussion of the state-of-the-art, Bryant refers to the 1995 second edition of Bicycling Science—where the same David Wilson that helped get Sharp's 1896 book republished, and who concludes in his book: "the balancing and steering of bicycles is an extremely complex subject on which there is a great deal of experience and rather little science"—as "another example of the limitations found with conventional analysis of two-wheeled vehicles." Archibald Sharp, Carlo Bourlet, David Wilson and Robert Bryant can all be considered experts on steering and stability of a two wheel tandem vehicle, however they do not form a consensus on the subject. Although many experts in the engineering and design of the bicycle have studied and analyzed the topic of steering and balance, the fact remains, over this long period, as far as known, nobody has succeeded in making a rideable two-wheel tandem vehicle that operates without a handlebar.

In his third edition of Bicycling Science, in which Wilson comments on why he decided to have Jim Papadopoulos write the chapter on steering and balancing—"the chapter on the topic that I wrote for the second edition . . . was the least satisfactory in the book"—Wilson remarks that over the years he has "found, through sending the drafts out to experts for review, that there seemed to be no agreement among experts on the topic." Papadopoulos, who is "a graduate of MIT with a Ph.D. in mechanical engineering, some-one who has devoted his life to the improvement of scientific and engineering knowledge of bicycles and bicycling", writes in the introduction of the chapter: "Unfortunately, the mathematics purporting to describe bicycle motion and self-stability are difficult and have not been validated experimentally, so design guidance remains highly empirical." At the end of the chapter, Papadopoulos cites thirty-seven references, including Sharp and three other experts from a hundred plus years earlier, in support of this finding.

All patents, patent applications, provisional patent applications and publications referred to or cited herein, are incorporated by reference in their entirety to the extent they are not inconsistent with the teachings of the specification.

BRIEF SUMMARY OF THE INVENTION

The invention is a velocipede—defined as a lightweight wheeled vehicle propelled by the rider—in combination with a pair of hand-grasped poles by which it is propelled. A forward member and a rearward member of the vehicle define a longitudinal axis. A forward wheel and a rear wheel are mounted to the forward member and rearward member, respectively, and align along the longitudinal axis. The forward member rotates about a substantially vertical steering axis which intersects the longitudinal axis defining a plane. The rear member is positioned on the plane and joined with the forward member along the steering axis. A saddle is connected to the rearward member of the vehicle. Footholds can be positioned on the forward or rearward member. The footholds and a saddle support a rider in a substantially upright position, facing forward with hands gripping the poles, while balancing astride the moving members which are supported on the axles of the two wheels.

DETAILED DESCRIPTION OF THE INVENTION

Concept

Figure 1:
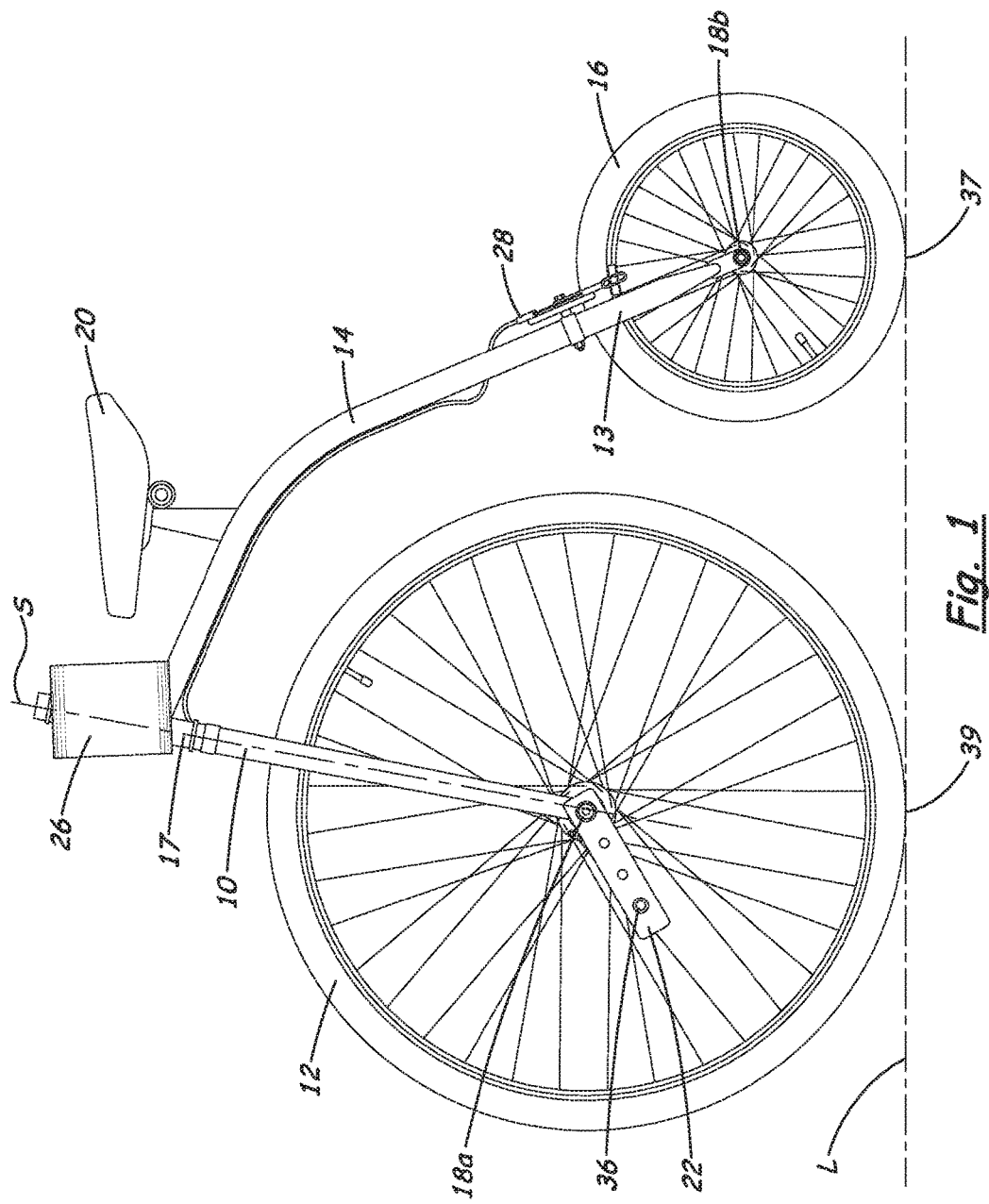
FIG. 1 is a side elevational view of a preferred embodiment of the vehicle of the subject invention.

Although a pole-driven cycle cannot be regarded as a suitable means for transportation, this deceptively simple concept can produce an altogether unique recreational ride that is both fun and healthy. Like a bicycle it provides great outdoor exercise, but instead of muscular legs it builds upper body strength, especially strong arms and shoulders. It allows a rider to use and experience their sense of balance, and improve their coordination. The rider can stop anytime without dismounting; and unlike in other apparatuses which are used for recreational activity—including skis, skates, skateboards, bicycles and scooters—the rider can remain comfortably seated, and rest while talking at length on their cell phone if so inclined. It is lightweight too, and can be easily carried—up or down stairs for instance.

An especially important feature of the invention is that the vehicle can be operated in either one of two modes: it can be ridden or it can be walked. And just as it is as likely to see a skateboard being carried as ridden, it is foreseen too that this vehicle will likely be seen "walked" as ridden. It is meant to share the sidewalks with pedestrians, like a scooter; and hence, operating at walking-pace speeds and slower, in either the walking mode or riding mode, was an important goal of the invention. It works well too at jogging and running speeds, in either mode, making it ideal for riding on neighborhood streets and bike paths. The new riding method created by the odd combination of this faintly familiar looking apparatus being propelled about by a pair of hand-grasped poles has a natural maneuverability which heretofore was unanticipated.

During those times in the course of a ride, due to unfavorable riding conditions, or any reason, the rider may wish to continue on foot by using the vehicle in its walking mode. The rider then can progress by walking to the side of the vehicle as it is pushed forward by one hand. It is a most natural process. Now afoot, the rider can carry the poles in one hand—or place them in a special holder attached to the vehicle—while gripping the saddle with the other and either walk or run alongside the gliding cycle. The rider steers by a simple twisting motion to the saddle. The cycle responds instantly and precisely to such commands without interfering in any way with the walking or jogging of the user. The self-steering cycle can be confidently "walked" in this manner without the need to look down at it or the road. Its large diameter front wheel and light weight allow it to be "walked" just as easily on paths or other unimproved surfaces.

The rider's distinctive stance differentiates the invention from other two-wheelers: The rider is seated in a sitting position with an upright torso, clutching poles; the thighs are bent forward at the hips, with the lower legs bent downward at the knee in a near vertical position, with the feet placed on footholds attached to either side of the vehicle. The rider's arms and hands are totally engaged with the poles: the upper body does not come in contract with the vehicle at all. From the waist up the rider resembles a cross-country skier, and indeed, moving forward using similar arm motions and upper body actions, it would at first glance appear so. Waist down however, the rider would seem more on horseback, supported by a saddle and footholds, astride the cycle with lower limbs pressing the frame. The primary purpose of the poles may be propulsion, but nevertheless, just like a skier would not attempt skiing without their poles, the rider would not contemplate its use without the security of the poles.

Two Wheel Tandem Vehicle

Employment of poles as a means of propulsion is ideally suited to a two-wheel tandem vehicle. It is surprising so many factors contribute to their successful use for this purpose. The rider's forward-facing upright stance and stable position in relation to the direction of travel are both essential factors. The narrow tract of the vehicle lends itself to poling—that is, propelling the cycle forward by the thrusting action of hand-grasped poles. The rider can lean their torso to extend their reach, either forward or backward, while applying varying amounts of force to the poles, either stroking with one at a time or both at once without interfering with the cycle's operation. And the rider's body itself, with its shoulders broader than its hips, and arms that bend and rotate in the direction of travel are perfect for the task. The fact that the vehicle has excellent coasting capability is a necessary condition.

On the other hand, a two-wheel tandem vehicle is inherently unstable and unable to stay upright on its own. Its operation is also the least understood of all wheeled vehicles, which has made it a challenging choice for a vehicle that could be successfully adapted to poling. The invention's unique ride is in part derived from the handling characteristics of the vehicle's two-wheel tandem configuration; and it was primary for this reason that this basic form was selected. Thus as a given, there are two critical factors that are peculiar to this type of vehicle—balance and stability—that must be dealt with. Balance can be thought of as that factor associated with the rider's ability to keep the moving vehicle upright; and stability is herein associated with the rider's ability to stabilize their body on the moving vehicle itself. The two factors are interrelated; one cannot happen without the other; and every aspect of the vehicle's setup and operation, with respect to the rider, is affected by them. And thus, the present invention is a result of the successful resolution of these two critical factors.

It has been determined by the inventor that said balance and said stability can be achieved while operating a two-wheel tandem vehicle without a handlebar; and it can be achieved concurrently with, and independently of, the rider's use of hand-held poles; and under certain conditions, or in certain situations, or during certain maneuvers, where it would not otherwise be, it can be achieved with the assistance of, or in conjunction with, the rider's use of hand-held poles. Reference to the rider's use of poles means: the rider's upper body makes intermittent contact with the ground or roadway via a pair of hand-held poles; and, although the primary function of the poles is to propel the vehicle forward by applying those thrusting actions which run parallel with the vehicle's direction of travel, other actions involving the use of the poles can be performed by the rider for reasons other than propulsion, such as those actions which a rider may perform that are related to said balance and that can assist in steering the vehicle, as herein disclosed.

Reference to a two-wheel tandem vehicle or configuration, or two-wheeler, herein means: a velocipede having two inline wheels, that is one wheel following the other, and two structural members which carry the weight, or mass, of the rider: the forward member 10 to which the forward wheel 12 is attached and the rearward member 14 to which the rearward wheel 16 is attached. The forward member is pivotally connected to the rearward member at the steering tube 17. Described more technically: the forward member and rearward member define a longitudinal axis, forward wheel and rearward wheel mounted respectively thereto and aligned along the longitudinal axis L; the forward member rotatory about a substantially vertical steering axis S; the steering axis intersecting the longitudinal axis defining a plane; the rearward member 14 positioned on the plane and joined with the forward member 12 along the steering axis. It is important to note that the setup of a two-wheel tandem vehicle, that is the rider's position with respect to the vehicle, is fundamental: The weight of the rider is carried by, and held largely between, the axles 18a, 18b of the two wheels; and the weight of the rider is evenly distributed, that is balanced laterally, on each side of the vehicle's longitudinal axis, which would be the case with a rider straddling such a vehicle.

Using Poles

The operation of wheeled vehicles is controlled through their connection with the riding surface via their wheels. In three or four-wheeled vehicles the interface between the user and road is straightforward and taken for granted. However in a two-wheel tandem vehicle this interface is complex due to the active participation required by the operator in keeping the vehicle balanced upright. In the invention the relationship between the operator and the vehicle is further complicated by the use of poles 24, which introduce an additional connection with the riding surface. As a result, two separate and independent control channels exist between the operator and the roadway: The one through the rider's lower body via the two wheels, which is in part controlled by the rider's feet and legs; and the other through the rider's upper body via hand-grasped poles, which is controlled in part by the rider's arms.

It may be difficult to envision the coordination of seemingly unrelated movements which the rider must perform to ride the cycle. To those skilled in bicycle design, it may seem that the use of a pair of hand-grasped poles as a means of propulsion in a two-wheel tandem vehicle would be impractical, and likely to overly complicate and compromise its operation. This inventor has demonstrated that this is not the case with the two-wheel tandem vehicle that is described herein as the preferred embodiment. The use of poles does not interfere with said balance or said stability; and in fact, the use of poles can benefit and extend the function and performance of said vehicle. And of utmost relevance, it was discovered that the use of poles in a two-wheel tandem vehicle, as a means for propulsion, or for the purpose of extending the function or performance of the vehicle, is intuitive.

The use of the poles can be especially advantageous at velocities that are at the lower end of the vehicles speed range, where they can play a part in steering the vehicle and in aiding the rider in certain maneuvers. For instance, in preparation for turning to the opposite direction, the rider can use the poles to help push the vehicle upright, thereby raising its center-of-mass so that the rider can then tilt the vehicle to the opposite side of its longitudinal axis. Or in another maneuver, the poles can be used to prevent the vehicle from falling inward during the execution of a tight turn, where the vehicle may tend to sharpen the radius, a phenomenon known in other two-wheel tandem vehicles. In such a case, the rider would lean on that pole that is toward the inside of the turn, and thereby prevent the vehicle from falling. It may be noted that in these examples the poles are used to generate force that is perpendicular to the direction of travel, and therefore illustrate that poles can indeed be used for a function other than propulsion.

Furthermore, it has also been demonstrated by the inventor, when coasting on a model of the preferred embodiment, as the speed of the cycle deceases, there exists a velocity below which the rider cannot maintain their balance without resorting to the aid of the poles. Below this velocity, which can extend downward to where the vehicle has come to a near standstill, a rider can use the poles in a way that can prevent the cycle from falling to one side or the other as it travels more or less straight ahead. It should be noted, therefore, that with the aid of the poles the cycle is capable of operating in a mode that is not consistent with that of a two-wheel tandem vehicle. From what has been discovered, it seems reasonable to presume that with a little practice the rider can learn to manipulate the poles in a manner that can add a dimension of maneuverability that is not possible at slow speeds in other two-wheelers. Also the poles were found to be particularly useful when initiating and terminating a ride, substituting as the "feet" on the pavement during those times, so the rider's real feet can stay on the footholds.

Stability and Balance

To help one understand the dynamics involved in operating the vehicle, the forces that bear on the vehicle which affect said balance and said stability can be differentiated with respect to the vehicle's longitudinal axis, which is closely associated with the direction of travel. A force, or component of a force, that is aligned with the vehicle's longitudinal axis cannot tip the vehicle. The end result is that said stability—that is a rider's ability to stay on the vehicle by being able to firmly attach their body to the vehicle at will—and said balance—that is the rider's ability to keep the vehicle upright—are only affected by force in a lateral direction, one which is normal to the vehicle's longitudinal axis. Consequently, a force that bears on the vehicle and rider, for example gravity, wind, or stress caused by varying road conditions, regardless of the direction of that force, can only tip the vehicle sideways.

If the question of said stability can be resolved, said balance becomes primarily an intrinsic function of the vehicle, based on its two-wheel tandem configuration and its setup, whereby the rider is enabled to spontaneously "catch their balance" by slightly pivoting the vehicles forward wheel to one side or the other in the direction in which they feel they are falling. Think of a broomstick being balanced vertically on the palm of one's hand, which must be continually moved in the direction in which it starts to fall in order to maintain its balance. In the case of a two-wheel tandem vehicle, it needs to be moving forward for this to work; and there is also a minimum forward velocity that is associated with its particular design, as in all two-wheelers, below which it becomes difficult for the rider to keep their equilibrium. Said balance cannot be discussed further without including the subject of steering, both of which are addressed together in detail herein.

On the other hand, said stability, becomes problematic without a handlebar. All preceding two-wheel tandem vehicles have relied on the handlebar to stabilize the rider on the vehicle. In the invention, some other means must fulfill this function, and its design will need to assure that a rider can safely stay mounted when operating the vehicle in general, as described herein, and do so while poling in all situations, including starting and stopping, and maneuvering under varied road conditions. The rider's lower limbs are required to provide this crucial support, that is the stabilization of the rider's body on the vehicle, while at the same time performing those subtle manipulations of the vehicle's forward wheel that are needed to steer and maintain its balance. These seemingly incompatible functions show why the concept calls stability into question.

It has been determined by the inventor that the support of the rider's body weight on the vehicle can be achieved by the employment of the rider's lower body; and this can be accomplished by using support means positioned at three points on the rider's body—at the buttock and both legs and or feet. According to the invention, a saddle 20 and footholds 22 are those support means which can be used for this purpose. In accordance with the invention, as normally ridden, a rider maintains constant contact between the three points and the support means. Under certain conditions, or when making certain maneuvers, especially during those times that one or both poles 24 are making contact with the roadway, varying amounts of the rider's weight may be shifted between the three support means, or between one or more of the three support means to one or the other or to both poles.

According to the invention, the buttocks and feet are the primary points-of-contact on a rider's body that engage the vehicle; and during the time that the vehicle is being ridden, they maintain contact with the vehicle. However, other parts of a rider's body can be employed to aid and assist the rider in stabilizing their body on the vehicle. Such additional contact between the rider's body and the vehicle would be accessory, or supplementary, to said primary points-of-contact. Whereas a primary point-of-contact passively engages the support means in order to support a rider's mass on the vehicle and thereby counter the force-of-gravity, employment of an accessory point-of-contact on a rider's body requires active engagement, that is the contraction of the rider's muscles, in order to engage an accessory contact means, and can thereby counter lateral force. When accessory contact means are so engaged, the rider's lower body forms a rigid connection with the vehicle, which often is necessary to provide said stability. In this regard, use of an accessory contact means can be temporary and intermittent even though that part of the rider's body which engages such means remains in contact with the accessory contact means after the completion of the task for which it was temporary employed.

The purpose of an accessory contact means is to provide a rider with an additional connection to the vehicle that can help the rider counter a state of temporary unsteadiness on the vehicle, where the use of the footholds and saddle alone may not suffice. A momentary condition of lateral instability, for instance, which might result from torque caused by foot-steering or poling, or maybe a sudden turn, could be such a situation. The riders' knees or thighs, for example, can be employed as the accessory contact points to handle these types of situations. The accessory contact means 26 can be positioned on either side of the steering tube 17, for instance, with surfaces that conform to the inner thighs and or knees, which the rider can press or clamp their thighs or knees against when needed. The front of the saddle can also be extended forward between the rider's thighs for this same purpose. Either way a rider can, in a moment's time, engage five points-of-contact on the vehicle—two footholds 22, the saddle 20, and two knee or thigh press points of the accessory contact means 26—and thereby stabilize their body on the vehicle.

It should be noted, as an alternative to said accessory contact means at the steering tube, or in addition to, stability could be enhanced by adding accessory contact between the rider's upper body and the vehicle. For instance, the forward part of the saddle can be extended upward between the rider's legs to form a brace with means attached thereto which enable the rider to engage their abdomen or chest, and thereby form a rigid connection between rider and vehicle. Such means would not interfere with a rider's ability to use the poles, nor the mounting of the vehicle, which can be done from the rear. Although the purpose of such an accessory contact would be primarily to improve the riders' lateral stability, it can protect the rider from injury during an abrupt stop or crash. It should also be noted that an actuator for a brake 28 to stop or slow the vehicle can be incorporated into, or made a part of, the means by which an accessory contact is implemented.

It is important to realize that with respect to said stability, the rider's use of the footholds is not equivalent to that of a handlebar. The footholds suffer from an obvious disadvantage. Unlike a handlebars, which are controlled by the very nimble arm-hand combination, footholds interface with the more sluggish leg-foot duo. The anatomical deficiencies of the latter for the purpose of stabilizing the rider's body on the vehicle, also present other challenges. The hand-griping function, which enables the arm-hand combination to engage in both a pushing and a pulling action, and which is an essential capability for bracing the rider in all other two-wheeler type vehicles, cannot be emulated in the present invention through the employment of the rider's lower limbs. Although the rider's use of the saddle, footholds and accessory contact means together may not fully compensate for the lack of a handlebar, the stability that is achieved is sufficient to ride the vehicle within the intended speed range of the invention.

Nevertheless, the shortcomings of the lower limbs as a substitute for the upper limbs need not result in the handicap of the vehicle, although the limitations imposed may be significant. The purpose of this invention is recreation, and therefore handling, and other characteristics of the vehicle, do not necessarily equate to the performance requirements of other vehicles, which may have other purposes. Things like slow-speed operation, and the unusual maneuverability, are meant to add interest to the invention and make it fun to use. It should be noted however, that the rider's use of poles can make up for this deficiency to some extent; and in the case of slow vehicle speed, the poles can assist the rider in ways in which handlebars cannot, and thereby extend the cycle's low velocity handling characteristics.

Steering and Mass

It is important to realize that in a two-wheeler said balance and the steering of the vehicle are really one in the same process. The cycle is not steered in the same sense as in other vehicles with three or four wheels, where an operator can accurately control the vehicle's direction by the use of a mechanical means for such purpose. The cycle is more indirectly steered, or urged, by the rider to progress in the desired direction, the actual course not being in a straight line, but based on, and secondary to, said balance. The process by which this takes place involves the lateral shifting of the rider's weight in conjunction with the direct manipulation of the angle of the vehicle's forward wheel, which prior to the present invention was accomplished through the use of a handlebar. In said process, rider and cycle become one, and work together as parts in a complicated maneuver that steers the vehicle—that is keeps it from falling, and headed in the desired direction. The rider's influence is subtle and intuitive, and difficult to quantify; but it is evident that the rider's mass and body English play an important role.

The rider's relative mass to that of the cycle is many times greater; and therefore, depending on the position of the rider with respect to the wheels, there can be a significant difference in that mass which is supported by each wheel. This can be an important factor in the handling of a two-wheeler. Nevertheless, during the long history of the bicycle, the saddle, which supports the major share of a rider's mass, has been positioned more or less over its entire length: from close proximity to the front axle in the "high wheeler" designs in its early history, to near the rear axle in some recumbent designs. For the most part, its position has been based on the location of the pedal crank, even though that position may have resulted in the less-than-ideal placement of the rider's mass on the vehicle. Furthermore, a rider's mass can move about on the vehicle: The pedal crank can be used in ways that can cause the rider's mass to shift from side-to-side, for instance when standing on one pedal. Also, the weight that the rider places, or the force exerted, on the handlebar can vary too, which can cause mass to shift from wheel-to-wheel.

On a bicycle, with the aid of handlebars the rider is able to overcome the disadvantage that may be caused by the less-than-ideal placement of their mass, or the shifting about of their mass, with respect to the vehicle. The process of balancing and steering is dominated by the use of the handlebars; whereas the mass of the rider plays a minor role. In the invention however, the less-than-ideal placement of the rider's mass on the cycle, or the shifting about of that mass during operation of the vehicle, can complicate and interfere with said balance and steering, as explained herein. According to the invention, a rider's mass is supported on the cycle in a more or less fixed position by the saddle and footholds; and it can be further steadied laterally, and braced in that fixed position, with the aid of the accessory contact means; and as a result, that portion of the rider's weight which is carried by each wheel remains more or less constant during the operation of the cycle.

According to the invention, the location of the footholds and saddle on the cycle determines the distribution of the rider's mass between the wheels; and the placement of the footholds and saddle on the vehicle can be critical to the operation and performance of the cycle, as explained herein. It should be noted that the position of the rider's legs and feet do not suffer restriction in their placement like that imposed in the design of the bicycle where the pedal crank, for example, determines the location of the rider's legs and feet. Therefore, any similarity or parallelism in the location of the saddle and footholds with that of any other two-wheel tandem vehicle, such as in earlier designs of the bicycle known as a "high wheeler," or in its modern configuration, is coincidental. As in the case of the bicycle, however, the saddle's location on the cycle is subordinate to the requirements of the function of the rider's legs and feet with respect to the operation of the vehicle.

In the control of the cycle in the invention, the significance of the rider's mass is that it relates to the development of torque about the cycle's steering axis. Said torque is a major factor in the process by which said balance and steering take place. It is important to understand that in said process, the control and determination of the direction of the steering wheel is dependent on several factors which can cause the steering wheel to pivot about the steering axis, the most obvious being the movement of the footholds by the rider's feet. Torque about the steering axis can also cause the steering wheel to pivot. When a rider leans their torso sideways, the cycle also tilts; and the inclination of the cycle's forward member can cause said torque. Retaining the rider's mass in a fixed position, and assuring that it can be held rigidly to the rearward member, prevents the torque from varying as a result of shifting weight on the forward wheel.

According to the invention, that mass which bears on the steering wheel's point-of-contact with the ground can be a major factor in the generation of torque about the steering axis, and as such, this mass can be a critical factor in the steering and balance of the cycle. Furthermore, said torque can be differentiated into two components, both of which rely on and exploit said mass, or a portion thereof. A first component of said torque is a function of the total weight of said mass. A second component of said torque is a function of only that portion of the weight of said mass which pivots with the steering wheel; and this mass has associated with it a center-of-mass which is located forward of the steering axis. It should be noted that the mass which bears on the rear wheel of the cycle has no effect on said torque.

It has been determined by the inventor that said balance and steering in a two-wheel tandem vehicle, as described herein as the preferred embodiment, can be achieved, in part, by using a technique by which the torque about the steering axis is manipulated and controlled by the rider. Using this technique, the direction of the steering wheel—that is the steering angle—can be continually varied by the coordinated actions of the rider's torso and feet; and in so doing, the equilibrium and course of the vehicle can be maintain. In particular, said torque responds to the degree to which the rider leans their torso with respect to the cycle's longitudinal axis; and that response can be modified, either damped or augmented, though the manipulation of the forward member by the use of the rider's feet.

Vehicle Layout

According to the invention, the rider's place on the vehicle is defined by the location of the saddle and the footholds. The saddle is fixed in position to the rearward member, which is the case in most two-wheel tandem vehicles. With the footholds there is a choice between locating them on the forward member or the rearward member. Early bicycles with their front-wheel drive, and modern ones with their rear-wheel drive, demonstrate that footholds can be mounted to either member without compromising the vehicle's two-wheel tandem configuration. It may be that the principles according to the invention could be applied to a vehicle with either arrangement, although their designs, and probably their operating characteristics, would differ. In either arrangement the rider would maintain the same stance and use of the poles. And those remarks pertaining to accessory contact means would be applicable, except for attaching such means to the steering tube, which would apply only to the former case.

Placing the footholds on the forward member has significant advantages over that of the rearward member and is thus preferred. As a practical matter, in the latter case, the rider's use of their feet to control the pivoting of the steering wheel would be accomplished indirectly via a mechanism located between the vehicle's wheels, which would require a linkage 30 that connects it to the steering fork 21. Such a mechanism may be awkward to use and its linkage to the forward member could be vulnerable. Both the mechanism and linkage would be eliminated by placing the footholds on the forward member. Furthermore in doing so, two very important benefits will result: The rider's mass can be shifted toward; and, the vehicle's wheelbase can be shortened since space for the rider's legs and feet would not have to be allocated between the two wheels. These benefits improve said balance and steering.

Figure 6:
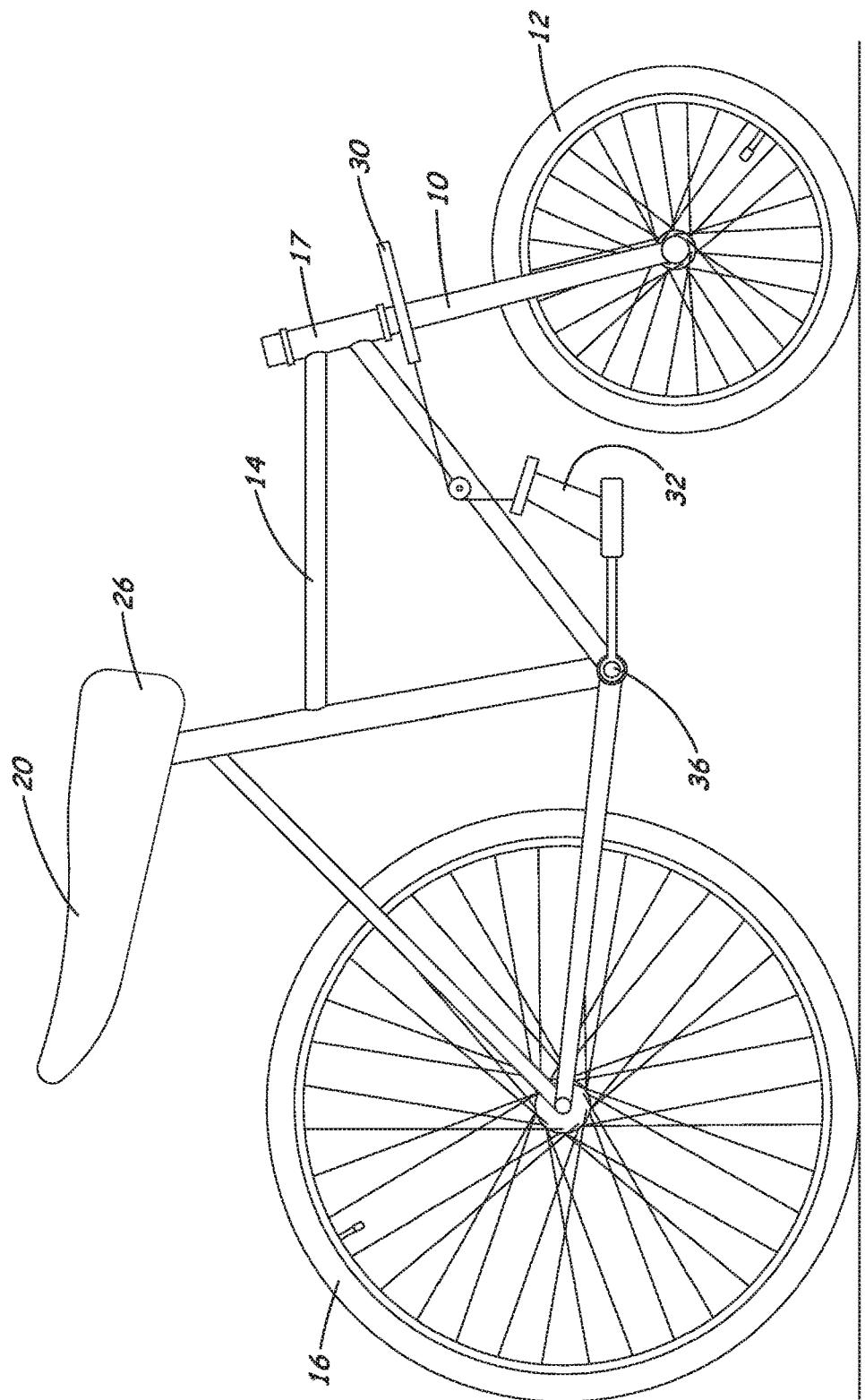
FIG. 6 is a side elevational view of another preferred embodiment of the vehicle of the subject invention.

Nevertheless, a pole driven two-wheel tandem vehicle with the foothold located between its wheels may be feasible. FIG. 6 illustrates the concept of such a vehicle. In this example, the rider's feet can control the pivoting of the steering wheel by their up-down movement of the forward part 32 of the foothold with respect to the rearward support peg 36, on which the heel of the foot rests. Note that to make the steering wheel deviate from its straight-ahead orientation, a reciprocating motion of the forward part of the two footholds is required—to turn the steering wheel to the right, the right foot rotates downward while the left foot rotates up. Alternatively, a mechanism and linkage operated by a forward-rearward motion of the rider's foot could be employed. In either case, it has not been determined whether such motion can be performed intuitively by a rider of such a vehicle. Although, a vehicle with its footholds attached to its rearward member falls within the scope of the invention, for the sake of clarity, all remarks herein shall apply specifically to that version of the vehicle in which the footholds are attached to the forward member, even though those remarks may also be applicable to the other. Reference to the cycle in the invention, or the model of the cycle, or the preferred embodiment shall refer to that case where the footholds are attached to the forward member.

By placing the footholds on the forward member, the rider's mass can be positioned further forward on the cycle than would otherwise be possible. The further forward the rider's mass, the more easily and faster it is to move that weight about laterally, and hence the easier it is for the rider to maintain their equilibrium. It should be noted that the quicker the cycle responses to changes in the steering angle the slower the speed at which the cycle can be operated. The shortening of the wheelbase is significant because it also contributes to the cycle's slow-speed riding capability, as explained herein. It should be noted that the wheelbase can be shortened further by reducing the diameter of the rear wheel thereby placing the wheel axles 18a, 18b even closer together. It should also be noted, that the shorter the wheelbase, the quicker the cycle responds to the twisting commands of the user's hand during the walking mode.

In the preferred embodiment, the position of a rider's legs with respect to the steering wheel is an important consideration. Due to the forward position of the saddle on the rear member, and as a result of the saddle's height above the steering wheel, the rider thighs can be extended forward over the top of the steering wheel, making them more or less horizontal, and thereby placing the knees forward of the steering tube. This permits the rider's legs to be situated so that they do not interfere with the steering wheel as it pivots to the left or right. The knees can be set apart by the accessory contact means, which can be located on either side of the steering tube, and would therefore make contact advantageously with the rider's inner tights. The span between the knees would be preferably equal to, and determined by, that by which the footholds are set apart. The knees would then bend downward, thereby permitting the lower legs—the shanks—to run parallel more or less with the steering axis, so that the feet end up at the correct points on either side of the steering wheel.

It is this orientation of the thighs, knees, shanks and feet that allows the rider's legs to remain more or less fixed in place as the steering wheel is being pivoted. The shanks are capable of pivoting without moving the knees, so that when the feet rotate on the footholds in the direction of the pivoting wheel, and thereby avoid striking the spokes, the shanks remain parallel to the steering axis. As the turning radius of the cycle deceases, it may be noticed that the foot to the inside of the turn moves rearward while the one on the outside moves forward. The rider can easily perform the necessary maneuver in a natural manner by swiveling the feet together in unison with the pivoting wheel. Even at very slow speeds, and where the sweep that the footholds make about the steering axis reaches its maximum limit, and where the rider may need to use the poles to keep their balance, the rider is still able to control the pivoting of the steering wheel with their feet.

It is important to note that the rider's lower body remains more or less stationary during the operation of the cycle even though the feet swivel with the pivoting of the fork. The rider can perform the necessary maneuvering of the footholds without disturbing the body's position on the cycle. This is significant because it permits the insides of the thighs or knees to engage an accessory contact means, at any time, by using the strength of the muscles of the inner thighs to clench said means between them, and thereby form a rigid connection between the rider and the rearward member. During the same time, or at any other, the rider can apply inward force on the footholds by pressing the feet inward toward each other, thereby providing addition rigidity to the lower legs. In this situation, it may be said that the foothold is also acting as an accessory contact means. The rider can also apply lateral force to one accessory contact means or the other, or one foothold or the other, or a combination thereof. These actions are performed intuitively by the rider without a noticeable effect on the overall handling of the vehicle.

Preferred Embodiment

Figure 2:
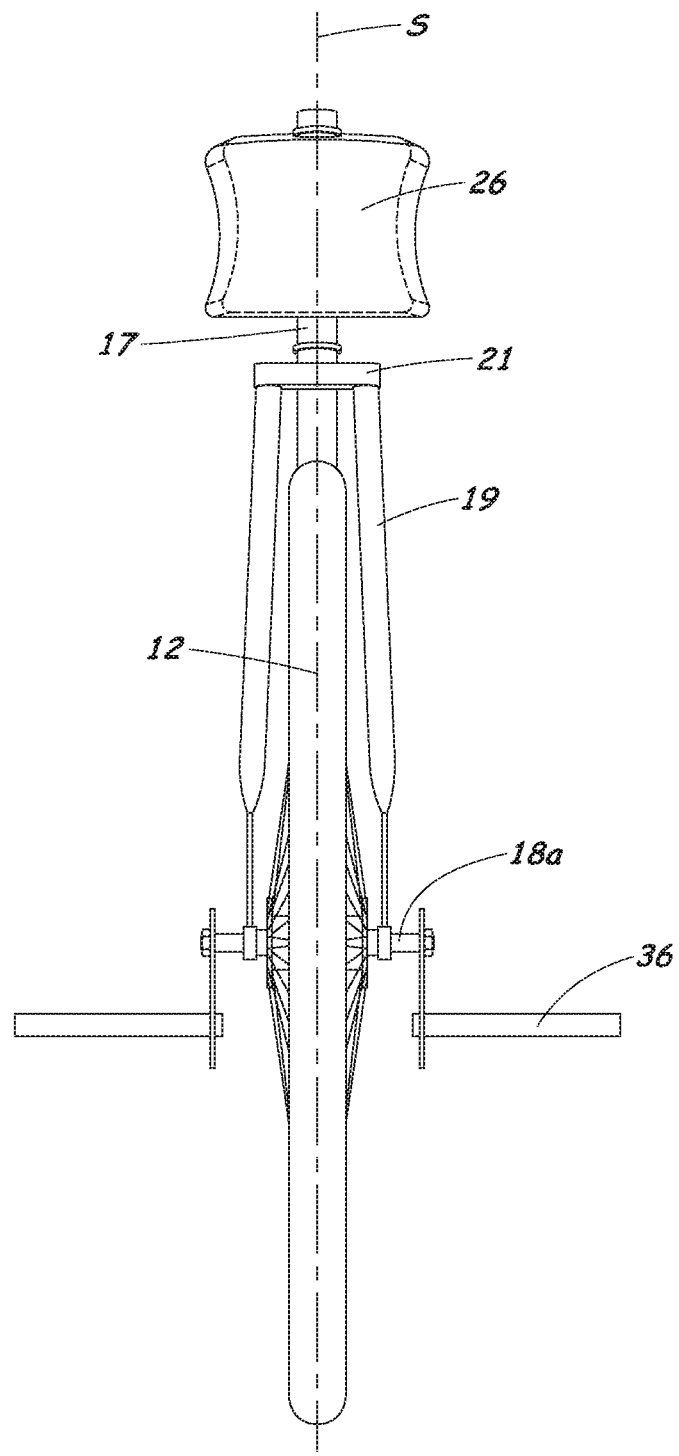
FIG. 2 is a front elevational view of the preferred embodiment of the vehicle shown in FIG. 1.
Figure 3:
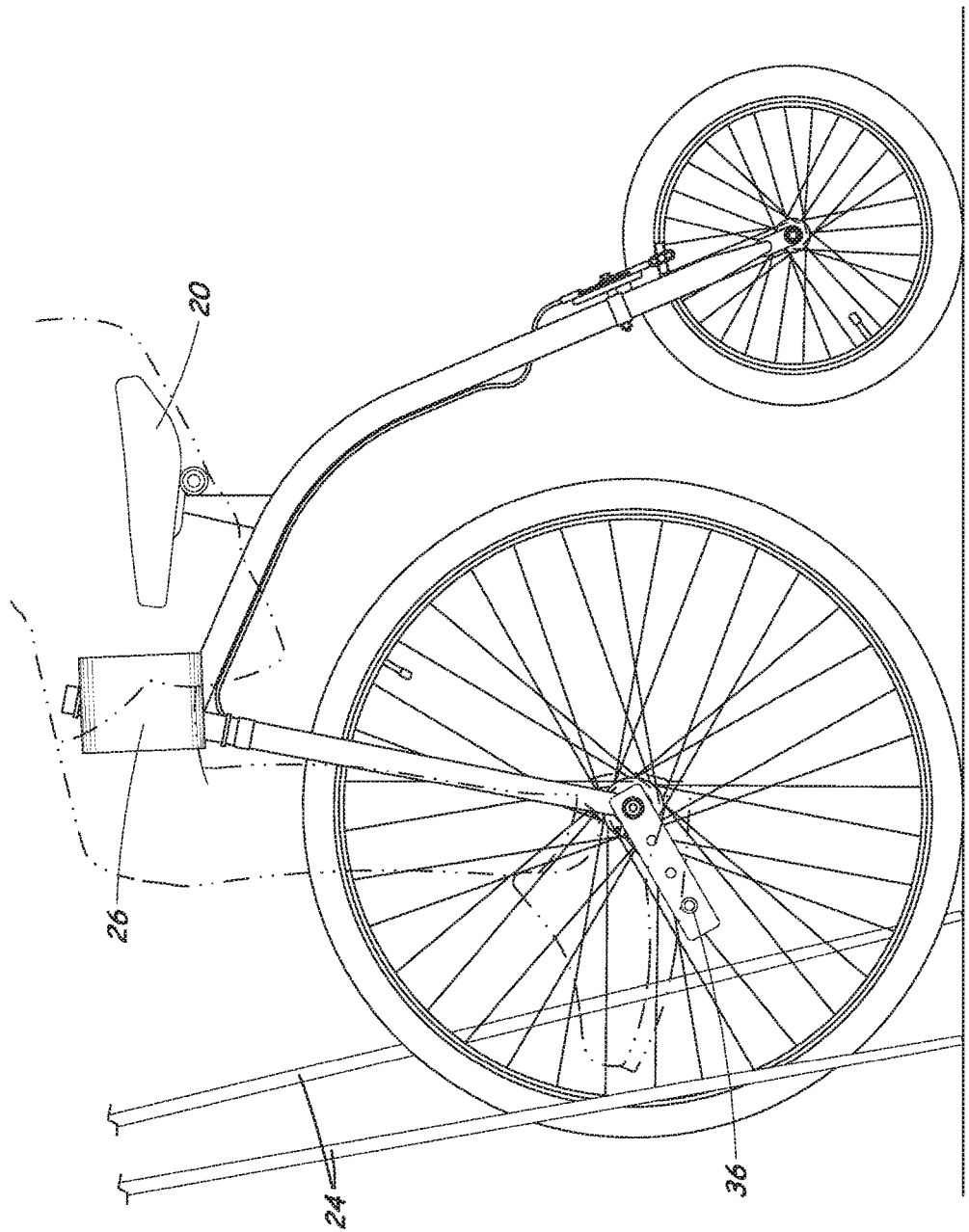
FIG. 3 is a side elevational view of the preferred embodiment of the vehicle of the subject invention shown in FIGS. 1 and 2 with a rider mounted on the vehicle shown in phantom.
Figure 4:
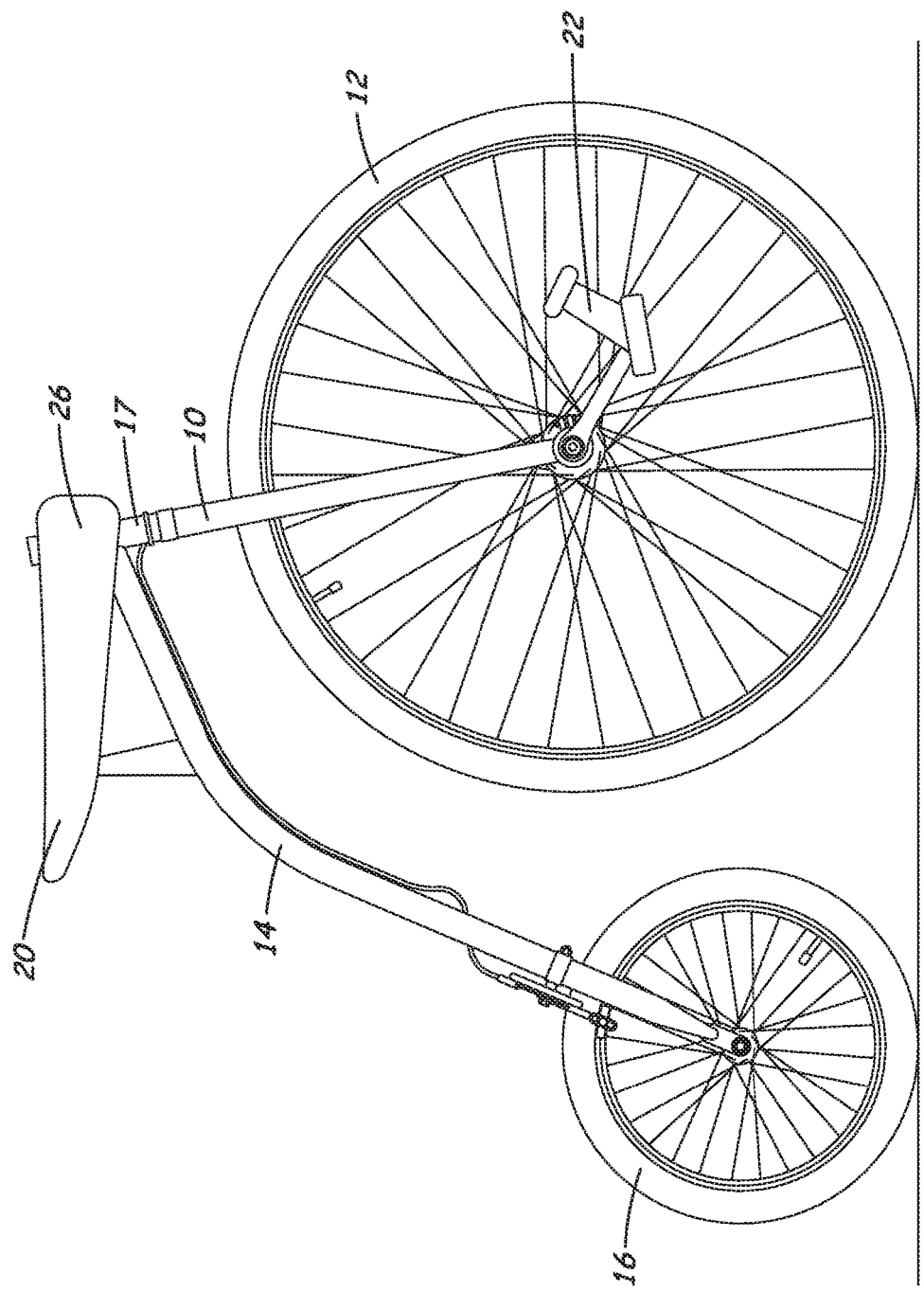
FIG. 4 is a side elevational view of another preferred embodiment of the vehicle of the subject invention.
Figure 5:
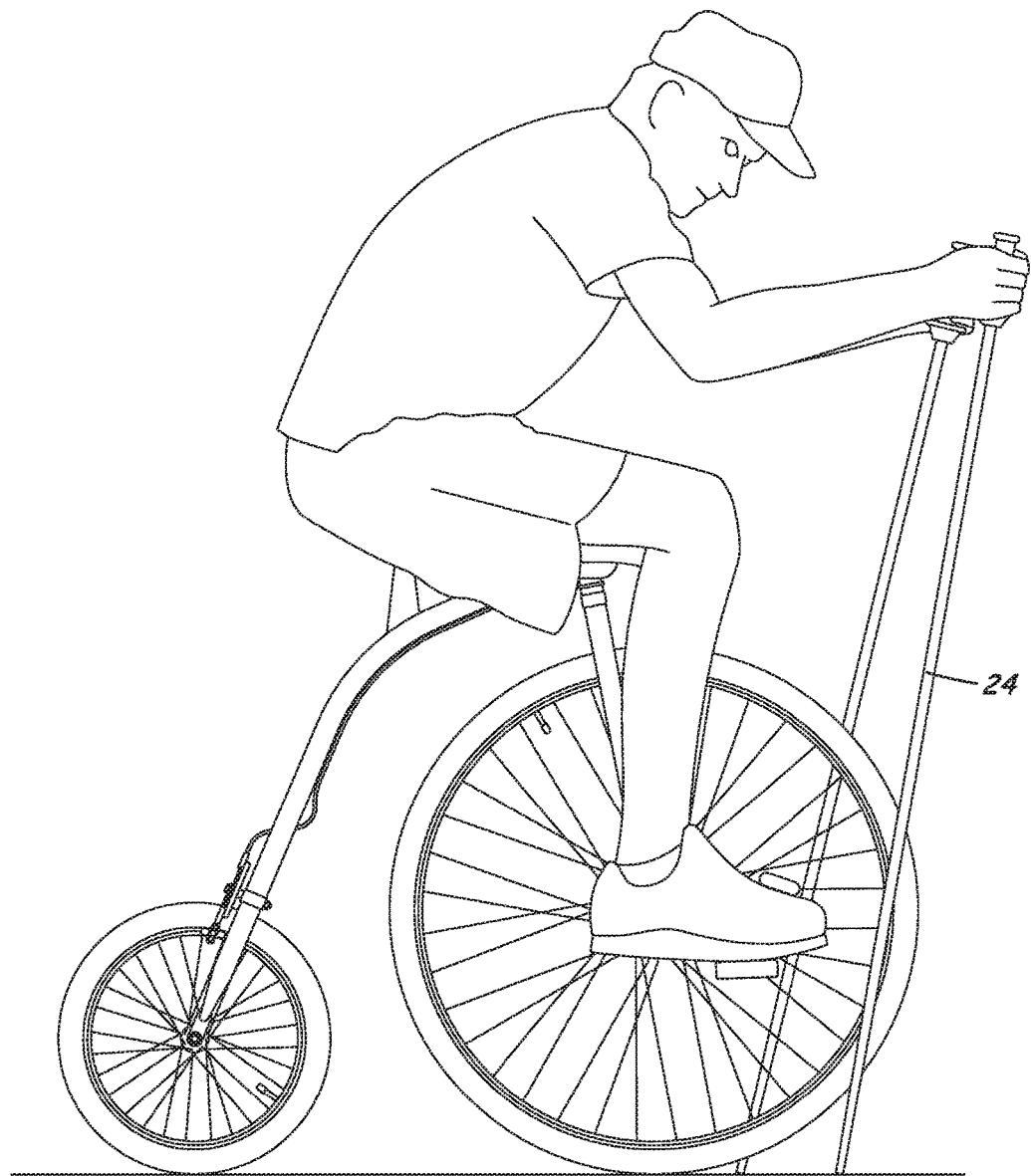
FIG. 5 is an environmental view of the preferred embodiment of the vehicle shown in FIG. 4 showing a rider with poles seated on the vehicle.

A preferred embodiment of the vehicle of the subject invention is shown in FIG. 1-3. This rideable two-wheel tandem vehicle is ridden where the body of the rider, from the waist up, makes no contact with the vehicle. It is easily ridden, and surprisingly smooth-riding and agile; and with the aid of the poles, this inventor was able to easily executed figure-eight's for example, at a very slow speed—much slower than a traditional bicycle can do—in an area less than the size of a single-car parking spot. In FIG. 4 said preferred embodiment is shown with the saddle integrated with the accessory contact means. The vehicle in FIG. 4 is shown in operation in FIG. 5. In FIG. 1-3 the foothold is shown in its most basic form where a single peg 36 under the arch of the rider's foot supports the weight of the leg. In FIG. 4-5 an example of a foothold is shown with a lower support and upper component, both of which can be positioned differently than shown. The upper component can resist upward force applied by the foot. It should be noted that the actuator for the rear wheel brake 28, which is preferably incorporated into the foothold, is not shown in FIG. 1-5.

In FIG. 6 a representation is shown of another embodiment of the cycle according to the invention. In this embodiment, the footholds would be on the rearward member of the vehicle. It should be noted that the subject representation has no brake as shown; the combined saddle and accessory contact means appear not braced; the forward member is not shown with offset mass, which would be required for the generation of torque by said second moment or method, as described herein; and, other overlooked details are apparent.

In the preferred embodiment, the footholds 22 are located on the forward member 10, one on each side of the front wheel or steering wheel 12; the accessory contact means 26 are located on either side of the steering tube 17 with respect to the longitudinal axis; and, the saddle 20 is located on the rearward member 14 fixed at a height above the ground that permits the rider to place their feet on the ground while sitting on the saddle with their legs straddling the cycle. The position of the saddle with respect to the steering axis is based on, and established by, the position of the footholds. The footholds are attached to the legs 19 of the steering fork 21 in such a position that that part of the foothold which supports the weight of the rider's foot and leg is located forward of the steering axis. A conventional bicycle brake 28 that is operative on the rear wheel 16 is controlled by a part of the rider's body, preferably the foot. A pair of hand-grasped poles 24 having hand grips on one end and rubber pads, or tips, on the other are provided for use by the rider.

The position of the footholds with respect to the center of the steering wheel (that is the axle 18a), and the position of the saddle with respect to the steering tube 17 and the riding surface, are dependent in part on the rider's leg size; and therefore, the position of the footholds and the saddle are both adjustable. For a given rider, the optimum position of the footholds and the saddle can be determined as follows:

First, the height of the saddle is set above the ground such that the rider's feet rest on the ground when the rider is seated at a standstill. Then, the initial fore-aft adjustment of the saddle is set so that when the rider's thighs are bent forward placing them above the steering wheel, the inner thighs, back from the knees, are able to press against the accessory contact means on either side of the steering tube. The knee's then extend beyond the steering tube (and preferably the accessory contact means) and bend downward so that the shanks of the legs run more or less parallel to the steering fork. The footholds can then be set such that their initial position places the shanks of the legs forward of the steering axis on either side of the fork. At this point, the vehicle should handle reasonably well. For each rider there exists a sweet spot, or optimum position, for their feet, and the corresponding position of the footholds can be found by test riding the cycle. The vehicle can be further tuned to the rider by adjusting first the fore-aft position of the footholds, then readjusting the fore-aft position of the saddle if necessary; and then after each such adjustment of the footholds, the vehicle should be road-tested again.

In the model of the preferred embodiment of the cycle shown in FIG. 1, the form of the rearward member 14, that is the cycle's frame, and that of the forward member 10, that is its steering fork, may appear similar to that of other known two-wheel tandem vehicles. The single-tube "backbone" type frame connects at one end to a 9 inch rear fork 13 to which a 16 inch diameter standard bicycle wheel mounts. The selection of the rear wheel 16 diameter was based in part on minimizing the cycle's weight and wheelbase. The other end of the frame connects to a 7 inch long steering tube 17 which mates with a 17 inch straight steering fork 21, which has no offset—that is the steering axis intersects the axle of the wheel. A 28 inch diameter standard bicycle wheel mounts to the fork. The diameter of the steering wheel 12 was specified as large as possible, it being restricted by the rider's ability to lower their feet to the road when seated in the saddle. The trail (defined herein) was set at about 4 inches; and the wheelbase at approximately 25 inches. Pole lengths of both 48 inches and 53 inches were used. A common bicycle saddle 20 attaches to a post which is connected to the frame approximately 8 inches back from the steering tube.

The size and shape of the accessory contact means 26 can vary. In the model, as shown in FIG. 1-3, the outward facing surfaces of said means, which contact the rider's inside thighs, are about 4 inches wide by 6 inches in height with a slightly concave shape that conform to the rider's thigh. The forward edges of said two surfaces are about 6 inches apart at their narrowest point, thus separating to the rider's knee by this amount, and taper in to about 4-5 inches apart at their rearward edges. The size and shape of said surfaces is not critical—ones that were half as wide seemed to work just as well. The accessory contact means can be separated into two parts, there being a left-thigh contact and a right-thigh one. The accessory contact means can also engage the inward sides of the rider's knees, either together with the thigh or instead of however, it is important that that they do not interfere with the movement of the shanks with respect to the knees. It is important that said surfaces be firm and rigidly attached to the rearward member.

The shape of the footholds 22 can also vary, there being no restriction on their form except that of supporting the weight of the rider's legs and feet, and that of being capable of bracing against inward lateral (toward the wheel) force which the rider may apply with their feet. The position of the foothold is adjustable up-down and forward-aft, as illustrated in FIG. 1 by the four holes in its mounting bracket—which allow the perpendicular support peg 36 that points outward to be adjusted horizontally—and by its rotatable position with respect to the wheel's axle—which allow the peg to be adjusted vertically. The separation between the footholds, which is shown at about 7 inches, can also vary. To make transport of the cycle easier, the support pegs may be made to fold upward, so that they do not protrude outward, thereby permitting the vehicle to lie flat. The design of a foothold, and the way in which it attaches to the fork, and the way by which it is adjusted to the rider's foot, and the way by which it can be adjusted to the length of the rider's leg, can all be varied as long as the foothold fulfills the purpose intended, as described herein.

Figure 7:
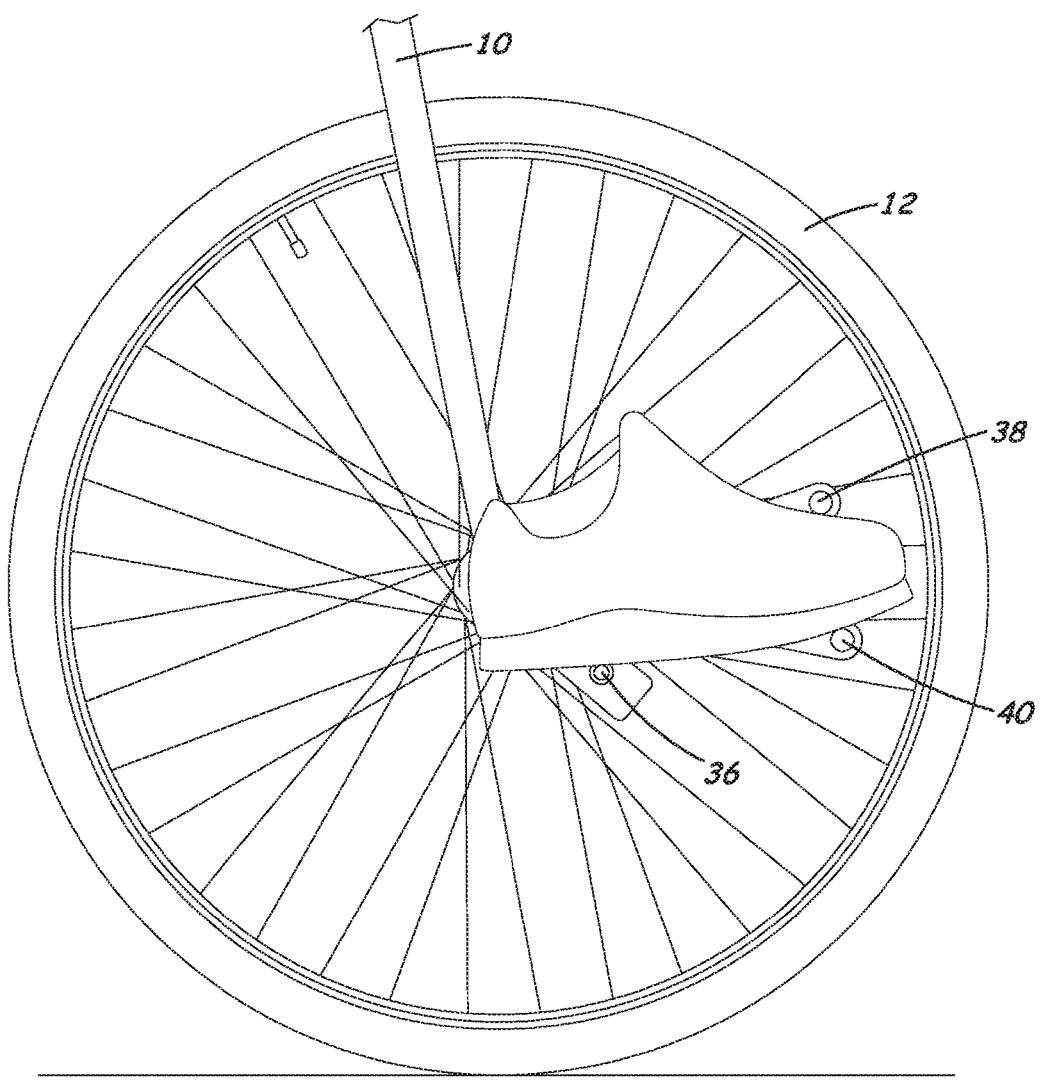
FIG. 7 is a partial side view of a preferred embodiment of a brake actuator on the vehicle of the subject invention.

It should be noted that a most advantageous method of operating an actuator for the brake 28 may be that which is performed by the rider's feet. As illustrated in FIG. 7, when the rearward part of the foot is used to support the weight of the leg—the support peg 36 of the foothold being placed under the heel or arch for instance—the forward part of the foot is able still to rotate up or down. This action could be used to control the actuator for the brake, provided that the task does not interfere with the general operation to the vehicle. For example, as shown in FIG. 7, a lever 38 placed above the foot, which is operated by the upward pivoting of the rider's foot, or a lever 40 placed below the foot, which is operated by the downward pivoting of the rider's foot, could be used to actuate the rear brake 28. Alternatively, either lever could be used to control a brake (not shown) which is operative on the front wheel. It should be noted that the lever on one foothold may be operated independently of the corresponding one which is on the other. It should also be noted, that on each foothold, one lever or the other could operate a brake, the other being replaced by a fixed peg which is capable of resisting upward or downward force, whichever the case. Furthermore, if peg 38 is made fixed it would then be an accessory contact means since the muscles of the rider's foot and or leg would need to be contracted in order to engage it.

Operation of the Cycle

When first observing the inactive cycle, it may be assumed that it is steered by the footholds with the rider's feet, because without a handlebar there would appear to be no other way. Yet when observed in operation, aside from the rider's poling strokes which are obviously propelling it onward, there is no noticeable action that indicates the rider is in control of the vehicle. In fact, even when riding the cycle, as this inventor as done, it is not apparent how it works. It is clear, however, that cycle and rider lean into turns together, as one rigid mass; but whether this lean is an initiation of action, or a response to another action, cannot be discerned. The lean of rider and cycle, and the pivot of the cycle's forward wheel appear to be simultaneous acts.

As the steering wheel pivots one way or the other, the rider's legs seem to remain more or less fixed in position with respect to each other, like they would in a normal sitting position as illustrated in FIG. 5. However, without appearing to do so, the shanks of the legs pivot at the knees, with the ankles adding to the movement, and thereby together allow the feet to follow the rotating movements of the steering fork. The feet move more or less in unison, to the left or to the right, using the footholds as guides to follow the same pivoting motion of the steering wheel. The swiveling of the feet is necessary in order to avoid striking the spokes. From the perspective of the rider the actions of the legs and feet are spontaneous; and again, it is not clear whether the feet are following the action, causing it, or leading it.

Consider a rider propelling the cycle down a straight bike path at a moderate speed (say four to five feet per second). When the vehicle is felt to be falling to the left-hand side, the rider intuitively steers to the left to keep their balance—that is the rider guides the vehicle in a circular arc, the center of which is situated at the left-hand side of the vehicle. Centrifugal force due to the circular motion of the vehicle and rider now balances the tendency of the vehicle to overturn. In fact, the rider automatically steers the vehicle in a circle of such a radius that the centrifugal force slightly overbalances the tendency to overturn, and the vehicle again regains its vertical position. The rider now steers for a short interval of time exactly in a straight line. But probably the vertical position has been slightly overshot, and the vehicle falls slightly to the right-hand side of the vehicle. The rider now unconsciously steers to this side, again in a circle now having its center to the right-hand side—and so forth. If the track of the vehicle is examined it will be found to be, not a straight line, but a long sinuous curve.

The above illustration of riding a cycle was actually provided by Archibald Sharp and refers to a tradition bicycle, but was used here because it applies as well to the invention. Sharp's two-wheeler is equipped with a handlebar, and when Sharps refers to "steers" it means of course "with" the handlebar. In the invention, steering the cycle is just as intuitive and automatic, except an apparent explanation is not as handy. Obviously the rider's feet, which engage the footholds, play a part as speculated herein; however other forces are at play too. When Sharp refers to centrifugal force, it is in the context of keeping the bicycle upright; the mass which the force pushes against in order to prevent the vehicle from falling being mostly that of the rider. The influence of other forces, if any, is not mentioned.

In the invention, the cycle operates by the same principle as the bicycle in Sharp's example, although in comparison, its control is dependent more on the cycle's configuration and the dynamics involved, instead of on the rider's intervention though the use of the handlebars. A key factor in the operation is the torque that is created about the steering axis, which is a consequence of the geometry of the vehicle's layout and its effect on the vehicle's behavior in the presence of the force-of-gravity. If the steering wheel is free to orient itself, the torque will tend to pivot the steering wheel about the steering axis in the direction of this twisting force. In Sharp's example, the torque that is generated about the steering axis is not considered necessary to the bicycle's operation; and its effect is overpowered by the rider's use of the handlebars, which dominate the vehicle's handling.

When the cycle is being ridden—fast enough to where the poles would have little effect on its steering and balance—it is usually tipped, if only slightly, to either side of its longitudinal axis. As a consequence, two variables associated with the dynamics of controlling the cycle—the tilt angle and the steering angle—are continually in play. At any instant the rate at which the vehicle turns is controlled by a combination of these two angles. The tilt angle is defined herein as the inclination of the vehicle plane—defined by the rear wheel point-of-contact with the ground contact 37 and the steering axis—from its mid-plane or vertical position. The steering angle is defined as the deviation of the forward member from its straight-ahead or mid position. Both angles have a left or right polarity, which is with respect to their mid or middle positions. It should be noted that when the vehicle is upright—the rear wheel being vertical—and both wheels are perfectly aligned, the tilt angle and the steering angle are zero; and therefore no torque is present about the steering axis.

As the tilt angle and the steering angle vary—that is the cycle is not in a perfectly vertical position—torque will develop about the steering axis. The tilt angle is at the rider's command, which the rider controls by leaning sideways. To produce a desired steering angle, if no account is taken of the rider's feet on the footholds, a certain amount of torque must be generated about the steering axis in order to pivot the steering wheel. Initially the torque will be clockwise when the vehicle is tilting to the right of the longitudinal axis and counter-clockwise when tilting to the left. And as the steering wheel pivots, the weight of the rider's lower legs, which is supported by the foothold, pivots with it. It is at this point, after which the vehicle has responded to the rider's initial tilt command, and the rider is to one side of the vehicle's longitudinal axis, the explanation of the vehicle's behavior in responds to the rider's handling becomes less clear.

In general, when the rider leans their torso sideways—and possibly together with other forces—the steering wheel tends to follow. It may be that the pivoting of the steering wheel is also being influenced directly by the rider's feet via their engagement with the footholds. Although it is difficult to determine the actual scope of their influence, it is the opinion of the inventor that the steering of the cycle is not dominated by the use of the footholds. It seems that the rider relies to a greater extent on the tilting of the vehicle, and the resulting presents of torque about the steering axis; and the use of the footholds is more to augment or damp the effects of this torque, as may be needed. It may be helpful to note, during actual riding conditions, the steering angle would most likely fall within a range of plus or minus 10-40 degrees across the vehicle's speed range, the lower figure being for the fastest speed, the upper figure being for the slowest, with plus or minus 20 degree being the nominal range during typical riding situations. The corresponding tilt angles for this typical riding situation would likely be much less.

When the torque is in balance with those forces tending to counter-twist the steering wheel, as explained herein, rider and cycle will be in equilibrium and the cycle will be turning at a constant radius. The tilt angle and steering angle will also be constant, and the force that the rider is applying to each foothold will be steady. If any of a number of variable changes, including the cycle's velocity, the tilt angle, or the force that is being applied to the footholds, the cycle will enter a state of transition until a new state of equilibrium is reached. The rider is able to intuitively control this process. As a practical matter, it should be noted that it is not likely that a rider would attempt to vary the steering and tilt angles in opposite directions without upsetting the vehicle, excluding the well-known phenomenon of counter-steering, during which such a condition could momentarily take place. It is not known to what extent, if any, counter-steering plays in the invention, although if it is a factor, it would be dealt with intuitively since the rider of the model had no awareness of it.

Referring back to Sharp's illustration of riding a bicycle, this process of balancing works until the vehicle's velocity falls below a certain speed, at which time the centrifugal force caused by the circular motion of the vehicle and rider becomes insufficient. When this happens, the rider finds it difficult to maintain balance, and may choose to speed up, or instead, attempt to stay balanced by swinging the handlebar in the opposite direction from the lean, rapidly countering the lean—then back the other way, and so on. This action causes the center-of-mass of rider and vehicle to rise up, and to oscillate back and forth about the longitudinal axis in sync with the swinging handlebar. However, as the bicycle's speed drops further, the rider is no longer able to maintain balance. Centrifugal force is no longer a factor, and the rider is forced to extend a leg to prevent the vehicle from falling to the ground.

This is not the case with the invention. First of all, the vehicle has a shortened wheelbase, more on the order of a scooter, which allows it to develop nearly twice the centrifugal force for a given speed and turning radius versus a traditional bicycle; and therefore the vehicle can naturally maintain balance at much slower speed. Nevertheless, there is a point where a lack of centrifugal force exists due to insufficient velocity, and the vehicle starts to become difficult to balance. It is at this point that the use of the poles—the manner in which they are manipulated—that fulfills the invention's goal of slow-speed operation. The poles can be used to maintain the vehicle in a near-vertical position, which allows the cycle to travel in more or less a straight course. This maneuver is possible because the rider can sense when the center-of-mass of rider and vehicle is over the longitudinal axis, and instantaneously correct for the smallest deviation to either side, using that pole on the side to which the vehicle is tending to lean, to push—that is supplying sufficient lateral force—and thereby rebalance the vehicle and rider. With the poles the rider can actually stay upright right down to zero velocity without having to lower a foot to the ground.

Furthermore, during operation of the cycle at slow speeds, the poles can be useful in turning. For instance, a pole can be employed to prevent the vehicle from tilting into a turn further than intended, and this can be done in a manner that at the same time provides some forward thrust that propels the cycle onward. Or, when preparing to turn to the other side, a lateral shove with the pole can raise the rider's center-of-gravity and help push the rider over to that side of the vehicle's longitudinal axis. However it may be noticed, especially at very slow speeds where the rider may not be able to preserve equilibrium without the use of the poles, the cycle will tend to keep turning sharper into the turn causing the rider to fall unless the pole is extended outward. It is not possible to prevent this from happening by using the footholds alone. When this occurs the rider must employ the pole to raise their center-of-mass by pushing laterally on the pole, or instead, possibly just lean on the pole to maintain the present height of their mass, and thereby prevent the reduction of the turning radius.

Generating Torque

Torque is in fact a moment, and as such is the product of force acting on a lever arm. As noted, torque can occur about the steering axis whenever the rider is leaning sideways, which causes the tilt angle and the steering angle to be greater than zero. As further noted herein, there are two components of said torque: one being a function of the mass which bears on the cycle's forward member, the other being a function of a portion of that mass. Each component of said torque has a lever arm which is associated with specific variables of the cycle's design that are related to the setup of the vehicle's forward member. The generation of torque about the steering axis, therefore, can be viewed as a process that involves two separate methods.

A first method, which relies on the fundamental configuration of the traditional bicycle, is based on the trail of the vehicle's forward wheel, or more precisely its mechanical trail—defined as the closest distance between: the point-of-contact of the steering wheel with the ground 39, and the steering axis. The trail, in effect, is the lever arm of the moment in said first method, and as such operates about the steering axis. The trail is a result of the rearward slant of the steering tube. As said slant increases, that point at which the steering axis intersects the ground moves forward with respect to the steering wheel point of contact with the ground and that increases the length of the trail.

It is important to realize that said lever arm is in the plane of the steering wheel and has no affect when the steering wheel is aligned with the vehicle plane, that is when the front and rear wheel contact points with the ground are in the plane that includes the steering axis. Said lever arm comes into play whenever the steering wheel deviates from its straight-ahead or middle position. When that occurs the steering wheel point-of-contact with the ground moves away from the vehicle plane. This causes the support force—that is the force which pushes vertically upward on said point-of-contact in reaction to the weight on the wheel—to form a component, which is perpendicular to the plane of the wheel. Said component force acts on the lever arm. The resulting moment can produce torque that tends to pivot the wheel in the direction in which the vehicle tilts.

In a second method, the generation of torque is based on that distance from which the center-of-mass—of that mass which rotates about the steering axis—is spaced, or offset, forward of the steering axis. Included in said mass is the front wheel and fork, and in the case of the preferred embodiment, the footholds and that portion of the mass of the rider's legs and feet that is supported by the footholds. The weight of said mass can produce a moment about the steering axis, its lever arm in effect being equal to the length of the perpendicular distance between the steering axis and said center-of-mass. It is important to understand, that when the vehicle is upright with the tilt angle near zero, and the steering wheel is at its middle position with the steering angle near zero, the force-of-gravity from a side-to-side or a lateral perspective is parallel to the steering axis, and therefore its effect on said mass is directed downward in the plane of the steering wheel; and hence no torque is being generated from said second method. Whenever the vehicle tilts—the tilt angle being greater than zero—the effect of the weight of said mass creates a downward force that is not in the plane of the steering wheel. This force has a component that is perpendicular to the plane of the steering wheel; and said component can act on said lever arm and produce torque which tends to pivot the steering wheel about the steering axis.

In the case of the preferred embodiment, the front fork 21 is straight, that is the legs 19 of the fork are aligned with the steering axis. Therefore the mass of the fork and wheel is symmetrically distributed in the plane of the wheel with respect to the steering axis; and consequently, this mass is not a significant factor in the production of torque. Hence, it is the placement of the footholds and the weight which they support that is responsible for the generation of torque in the second method. According to the invention, in the preferred embodiment of the cycle, the position of the footholds is a critical factor in the steering and balancing of the vehicle. In the case of the cycle with its footholds attached to the rearward member, referred to earlier, in order to generate torque by said second method, the front wheel could be offset by curving the fork legs 19 forward, for instance, or some other way which places weight forward of the steering axis.

It should be noted that in a bicycle—where the term "offset" is defined as the shortest distance between the steering axis and the axle of the steering wheel—the front axle is generally forward of the steering axis, which shifts some of the weight of the fork and wheel forward of the steering axis. Excluding that weight that a rider might contribute by leaning on the handlebar, as would be the case when steering without hands, only a small amount of torque is generated about the steering axis due to said offset. Although in the case of the preferred embodiment of the cycle said offset is zero, due to the horizontal position of the rider's thighs, which extend forward over the top of the steering wheel, the mass which is supported by the footholds can be significantly greater than the combined mass of the wheel and fork, it being approximately fifteen percent of a rider's total body weight; and therefore a significant amount of torque can be generated.

According to the invention, the center-of-mass of that weight which is supported by the footholds (when they are attached to the forward member) must be located forward of the steering axis. When this is true, said two methods of torque generation will tend to produce their torque in the same direction around the steering axis. Although the torque which is produced by each method may be associated with the force-of-gravity, it may also be true that the directions of the forces which act on the lever arm in each of said two methods are directed from opposite sides of the steering wheel. In the first method the force is rearward of the steering axis; and in the second method it is forward of the steering axis; the two lever arms being 180 degrees apart in relation to the steering axis.

If this be the case, then the force that acts on each said lever arm originates from opposite directions and therefore cannot be the same force in each case. In said first method, the force pushes vertically upward at the front wheel's point-of-contact with the ground—being the reaction to the force-of-gravity—and supports the total mass carried by the wheel. In said second method, the force pushes vertically downward—being the force-of-gravity—and bears on that mass which pivots with the forward member, which includes said offset mass. Therefore, it can be concluded that said first moment and said second moment are independent actions. Since the one does not depend on the other, either one can be adjusted or modified without affecting the other.

The rider can generate said torque in either direction—clockwise or counterclockwise about the steering axis—by causing the vehicle to tilt laterally to one side or the other with respect to the vehicles longitudinal axis. Therefore, to change the direction of the torque, and hence the direction in which the steering wheel is tending toward—either to the left or to the right of the steering wheel's mid position—the weight of the rider's body must first move to that side of the vehicle's longitudinal axis. In order for this to happen the rider's center-of-mass must be raised up on the one side in order for it to cross over to the other side of the vehicle's longitudinal axis, where it would then lower as the tilt angle increases on that side of the vehicle. This may require the rider's use of the footholds to create opposing torque, that is, damp that torque which is being currently generated by said two methods; but whatever that action is that the rider performs, it is apparent that it is done intuitively. At slow speeds the poles can also be used to help raise the rider, as disclosed herein.

Controlling Torque

It is important to realize that in the invention there are two center-of-masses (COM) that are associated with the operation of the cycle. A first one, which is commonly associated with the bicycle, is the COM for the entire system, which includes the mass of the vehicle, rider, and poles. This COM is located slightly forward of, and above, the saddle. When the cycle is turning, centrifugal force develops normal to the direction of travel—that is outward along the radius of the turn—and in effect pushes against this COM to counter the force-of-gravity, which is tending to tip the vehicle towards the center of the turn. The force-of-gravity and the centrifugal force tend to rotate the cycle in opposite directions about the longitudinal axis.

A second COM is that one that is related to the mass that pivots with the forward member and is associated with the steering axis. As previously discussed, the mass supported by the footholds can be relatively large due to the weight of the rider's lower legs; and therefore this second COM can be a significant factor in the handling of the cycle. In the modern bicycle, however, the COM of that mass which pivots with the front fork is not regarded as a significant factor in the steering and balancing of the vehicle. Compared to the effect that that centrifugal force which is being generated by the moving vehicle has on said first COD, the effect that that centrifugal force can have on the second COM, and how it might influence the balancing and steering of a tradition bicycle, is generally ignored.

It is of interest to note, in Archibald Sharp's analytical explanation on riding a traditional bicycle while steering without hands—where it is assumed that the tilt angle is small, and the steering angle is also small and constant, and no account is taken of the gyroscopic action of the wheel—there is no mention of centrifugal force. Sharp contends that it is centripetal force that is the primary force that produces the moment that opposes, that is balances, the other two fore mentioned moments—those associated with said first and said second methods of torque generation about the steering axis. Sharp believes that said centripetal force acts tangential to the steering axis at the steering wheel's point-of-contact with the ground, its lever arm being the length of the steering wheel's mechanical trail.

It is of interest to observe the affect trail has on the operation of the cycle in the invention. In an experiment conducted by the inventor, said model was modified so that its trail could be adjusted all the way down to zero. The model was tested as the trail was reduced by increments of twenty five percent; and as expected, its handling got progressively pooper; but surprisingly, even when the trail was adjusted to zero, the model could still be easily controlled. It is interesting to note that when the vehicle was being ridden without any trail, according to Sharp, said first method of torque generation, and said opposing moment due to centripetal force, would not have been operative, since both moments require the trail as their lever arm. If this be correct, then the presence of torque about the steering axis, if indeed it did exist, could have only been due to the effect of said second method.

Then in this case, in order to balance that torque which is being produced by said second method during a constant-radius turn for instance, or when vary the radius of the turn, some force other than centripetal force would have had to been involved. It would be reasonable to infer that that force could be either: centrifugal force acting on said first COM, or on said second COM, or to some degree on both; a countering twist about the steering axis that can create a damping effect, that is produced by the action of the rider's feet on the footholds; or some combination of the two. It may be that said second COM is too close to the steering axis, or and the vehicle's speed range is too slow, for said second method to be affected significantly by centrifugal force.

On the other hand, given that the cycle has some amount of trail, said centripetal force may be the primary force which can counter the torque that is present about the steering axis, as Sharp suggests. On the subject of no-hands steering in a traditional bicycle, Carlos Bourlet's, whose opinion was highly regarded in an era when these topics were studied at length, says that it would not be possible to ride a bicycle in which the steering axis cuts the ground at the point-of-contact of the front wheel—in other words a cycle with no trail. Taking this into account, one would be inclined to believe then, given the results of the experiment, the difference is a result of actions by the rider's feet on the footholds; or in other words, the cycle in the preferred embodiment works due to the subtle control that the rider is able to exert on the footholds.

The question of steering and balancing a two-wheel tandem vehicle has historically been regarded as complicated and especially confusing when no-hands riding is involved. In Sharp's opinion, a rider attempting to steer without hands by varying the tilt angle, that is balance the torque about the steering axis by adjusting the lean or lateral position of their torso, probably would not be quick enough to preserve the equilibrium of the vehicle. But this is not the case when riding the model of the preferred embodiment, which has been proven to be easily controlled. Hence, since the only substantial difference between Sharp's hypothetical example and said model is that in the model the torque about the steering axis can be influenced by the use of the footholds, one may conclude—taking in Sharp's opinion—that indeed the weight and subtle actions of the rider's feet on the footholds are in fact making the difference. It should be noted that in Sharp's example, the use of counter-steering would not have been possible since the handlebar was not being used. It is not known whether or not counter-steering is a factor in the steering of the cycle of the invention, although it would be possible to perform by the rider's use of footholds.

Sharp's analysis relates to a tradition bicycle where the only mass included in said second COM is that of the steering fork, front wheel, and the handlebar. And even though said COM is forward of the steering axis due to the offset caused by the bending of the fork legs, Sharp does not consider that centrifugal force could act on this mass to counter that torque that tends to pivot the front wheel about the steering axis. In the preferred embodiment of the invention, although the fork is straight, said second COM can be significantly shifted forward due to the placement of footholds. Therefore, the centrifugal force which can act on it may be a significant factor in pushing the steering wheel back towards its middle position, assuming that the rider's lower limbs cooperate. If this is the case, it should be noted that this action and its effect would seem to be similar to that of centrifugal force acting on the said first COM in preventing the cycle from falling to the side.

It may be noticed that offset is little mentioned in bicycle science. In the earliest bicycle designs, the steering forks were straight—there was no offset. Then with the advent of the safety bicycle—the modern two-wheeler—and throughout the twentieth century, offset was virtually part of every design: the legs the front fork being curved forward to produce it. It may be noticed that in all the references cited—Sharp's Classic Treatise, Wilson's Bicycling Science, Bryant's patent, and Papadopoulos' chapter in the most recent addition of Bicycling Science—the topic of offset is hardly touched upon, although in most cases a great deal of discussion is devoted to the topic of trail. Both Sharp and Bryant point it out in their analysis but then fail to discuss it. Papadopoulos simply states "The line of the steering axis commonly passes below the front axle, that is, the fork is bent forward."

It is important to realize that offset moves the steering wheel's point-of-contact with the ground forward, in the opposite direction of the trail; hence, for a given slant of the steering tube the trail will decrease as the offset increases. The only real purpose that offset provides would appear to be that of moving said second COD further forward of the steering axis. This is not necessary in the preferred embodiment of the cycle, given that that objective can be better accomplished by the placement of the footholds. Experiments were conducted on the model of the preferred embodiment where the steering fork was bent forward to produce vary degrees of offset. In general, the effect of vary amounts of offset was not significant, and no positive advantage could be discerned. The best overall performance seemed to be produced with no offset. Therefore, in a preferred embodiment, according to the invention, the cycle has a straight steering fork with no offset.

Other Factors

Up to this point in the discussion, the assertion has been made that the cycle referred to in the invention is steered to some extent by two independent moments, which can act together to produce sufficient torque about the steering axis that can cause the steering wheel to pivot. The influence on said moments of that torque which can be produced by the rider's lower legs via the footholds has not been taken into account, although it was speculated that the effect of such direct action could be to augment or damp the effects of said two moments. It should be noted that there is also a gyroscopic aspect—known to those in the field of bicycle design and cited by Jim Papadopoulos in the third edition of Bicycling Science—which may be a factor in the steering of said cycle; wherein, the angular momentum that is produce by the spinning motion of the cycle's steering wheel urges the wheel to pivot toward the side to which the cycle is being tipped. Thus, the effect of this gyroscopic action—known as precession—is to reinforce the said moments, that is add to the torque that is being generated by said first and second methods.

Furthermore, the angular momentum of the steering wheel is proportional to the square of the cycle's velocity. Therefore, the effect of precession can vary during the operation of the cycle, depending on its speed. To what extent precession may influence the handling of the cycle has not been determined. Whatever that extent may be, at normal speeds the effect if any can be interpreted as manageable and helpful based on the model's general performance. It may be that variations in torque that are caused by precession are intuitively compensated for by the actions produced by the rider's feet on the footholds. It should be noted, however, that a sudden change in torque may cause handling problems at higher speeds that could cause a destabilizing of the cycle, where the steering wheel could quickly turn inward during a turn, resulting in an upset.

In another aspect pertaining to steering, it was noted that the steering wheel can also pivot when lateral force is applied to the rearward member at the steering tube. This can be demonstrated when steering the cycle in its walking mode: where the dismounted rider walks alongside the cycle pushing it forward with their hand griping the saddle, and twists the saddle thereby causing the steering wheel to pivot. It is also possible to use this method while the cycle is being ridden; however, as in the case of the walking mode, the rear member of the cycle needs to be close to its near-vertical upright position for it to work effectively. Then, if the rider should twist their one thigh about the buttock, thereby applying lateral force with their inner thigh to one of the accessory contacts attached to the side of the steering tube, the steering wheel will pivot in the direction of the applied force. Although it may be difficult to discern, this action may be useful in causing the steering wheel to pivot from one side of the longitudinal axis to the other, and thereby help the rider to change direction faster. This action demonstrates that body English can be a factor in the control of the cycle. It should be noted that this effect is a function of the length of the cycle's trail.

It is important to realize that the speed range over which a two-wheel tandem vehicle operates is a major factor in its handling characteristics. These vehicles rely to varying degrees on the presents of centrifugal force, and its counterpart centripetal force, in their operation. These forces are a function of the vehicles speed, and are proportional to the square of its velocity. Thus the design of a particular type, or category, of two-wheel tandem vehicle is based in large part on its speed range. Within a category, the speed range can be viewed as a design parameter—that is the speed at which the vehicle is intended to be operated; or alternatively, it can be viewed as a limiting factor of, or inherent to, the design itself. For example, a bicycle can be designed for slower speeds, like a "cruiser" type, or for high speeds, like a "track" bike; but, it cannot be made to operate at very slow speed—like a scooter can, for instance. Likewise, a scooter can be designed to operate in varying speed ranges; but, no scooter would be stable at the speeds that the motorcycle operates. It is obvious that a bicycle, a scooter and a motorcycle are distinct vehicles in spite of their shared two-wheel tandem configuration.

The cycle in the invention is a distinct vehicle too. It should not be confused with other two-wheel tandem vehicles, like the bicycle for instance. In general said stability and balance are superior in a bicycle compared to that in the cycle of the invention; and therefore, a bicycle's handling characteristics can accommodate a much greater range of operating speed. In the invention, the attainment of a slow-speed operating capability is a major achievement that is conducive, if not necessary, for the particular means of propulsion—the use of handheld poles. The cycle's speed range is directly dependent on the movements—thus the muscles—of the rider's arms and shoulders. And like the scooter, on a level riding surfaces, the cycle cannot exceed the speed at which a rider can thrust it forward. Although pushing with the poles at a slower pace allows a rider to conserve energy when desired, exercise of the rider's upper body is an important feature of the invention.

As noted with respect to the generation of torque, said first and second methods are not depended on each other. Therefore, if either such method has a purpose other than torque generation, it would be advantageous to the cycle's design to consider it separately, and to determine its relative important to the vehicle's overall performance and proceed accordingly. Thus, in this regard, the primary purpose of the trail, which is associated with said first method, is to improve the basic handling of the vehicle, as is well known to those skilled in the art of bicycle design. Generally the same principles and consideration that apply to the bicycle would apply to the vehicle in the invention. In the construction of the model, prior to giving consideration to said second method of torque generation, the trail was optimized to produce the greatest benefit to the handling and stability of the vehicle based on: its operating speed range, wheelbase and expected mass of the rider. This was accomplished by tuning the length of the trail while the rider's weight was being supported, as near as possible, in the same ratio between forward and rearward members as it would be in the preferred embodiment.

With the variables associated with said first method established, said second method can then be dealt with, the goal being to optimize said second moment to produce the best steering characteristics possible based on the given torque generated by said first method. During the period of experimentation prior to the development of the preferred embodiment, several other attempts were made to ride varying designs of two-wheel tandem vehicles without handlebars. One of the most difficult problems to overcome was the reconciliation of the dual function of the footholds. On the one hand footholds were critical in stabilizing the rider on the vehicle; and on the other, they were a critical part of the steering process—seemingly incompatible objectives. The determination of their best location on the vehicle, which resulted in the effectiveness and the ease of their use by the rider, in fulfillment of both functions, was a major achievement. It is important to realize that their use, both as a means to pivot the steering wheel and to support the rider, should not restrict the natural tendency of the steering wheel to pivot in response to the tilt of the vehicle by unintentionally disturbing the presents of torque about the steering axis.

According to the invention, the optimization of the position and location of the rider's legs and feet on the cycle can be a critical factor in the steering and balancing of the vehicle. In this regard, the placement of the footholds with respect to the steering axis is the most important consideration in the case of the preferred embodiment of the cycle. It should be noted that whereas the generation of torque in said second method is concerned with the location and weight of the rider's legs and feet, the ease and control of the movement of the steering wheel by the rider's use of the foothold is more concern with the position of the legs and feet. Therefore, the location of the footholds must be such that the handling characteristic of the vehicle are optimized based on the mass and size of a given rider. As a practical matter the exact position of the footholds could be adjustable and set up at the time that the vehicle is acquired. Experiments using the model of the preferred embodiment showed that for a given rider there exists a sweet spot for the location of the footholds where the vehicle performed the best. If the position of the rider's feet were either move too far forward or rearward from this location the vehicle becomes unrideable.

Propulsion

Poling is feasible in a two-wheel tandem vehicle because the force that is necessary to thrust the vehicle forward can be applied in a direction that is parallel to the vehicle's inherently stable longitudinal axis; and, it can be done in a manner that does not produce a destabilizing moment—that is torsion about the rider—that cannot be countered by the rider's actions. To illustrate: In the simplest of propulsion actions, the rider commences by extending both arms forward; and with pole tips pointed straight down, plants them on the road; and then immediately—starting the power stroke—applies downward pressure on the tips to keep them in place, while at the same time, pulling the vertically held poles rearward by bending the elbows. The vehicle is thus trusted forward for that period of time during which it takes to cause the elbows to bend so that the pole handles end up even with the chest. The rider then completes the stroke by lifting the poles; and the arms are again extended forward to start the next stroke.

Note, that during the power stroke, with pole tips planted equal distance on either side of the longitudinal axis, when the rider applies equal pulling force to each pole, the torque that is produced by one pole is canceled by that which is produced by the other. The clockwise moment about the rider, which is caused by the rider pulling the left-side pole, is cancelled by the counterclockwise moment caused by the right-hand pole. Therefore, the net force thrusting the vehicle forward is in line with the vehicle's longitudinal axis. Fortunately, it was discovered that this degree of precision poling is not necessary in order to maintain stability, as disclosed herein.

Poling where both poles are used in unison, like the "double pull" stroke cited above, can be varied to suit different purposes. The "double pull" for instance, is an ideal stroke for very slow speeds where balancing is difficult, or not possible, without the effect of its stabilizing nature. Another example is the "double push", which is a good stroke for starting from a standstill, as illustrated here: The rider gets into position astride the stationary vehicle, with elbows fully bent drawing the poles to the chest, and pole tips planted below the saddle adjacent to the outside of each foot. Then raising the feet to the footholds while balancing upright between the poles, the rider starts the power stroke by rocking forward, rotating the upper body at the hips, while applying that same downward pressure to the poles that keep the tips in place. And, as the shoulders pass forward of the pole tips, the rider trusts the poles backward, partially unwinding the elbows to complete the rather short stroke. The poles are then rapidly lifted and moved forward to repeat the stroke, and so on, until the vehicle gains efficient momentum.

The force applied to any stroke, or elapsed time between successive strokes, can be varied by the rider to suit conditions and circumstances. A very rapid full power "double pull" stroke might be needed for fast acceleration. Or in heavy pedestrian traffic, the same stroke could be used to move very slowly by applying minimum power but very quick elapse time between strokes, thereby keeping the poles in contact with the road as long as possible. And again for example, under aggressive poling, the long and efficient "double pull-push" stroke, which combines the "double pull" and "double push" strokes, the one picking up where the other left off, can be the best stroke for power and speed; however with less aggressive poling it can also be a great cruising stroke with a hypnotic rhythm. The trusting power of any one of these three "double" type strokes can be increased by either: extending the poles further forward at the start of the stroke by bending the upper body forward at the hips, or extending the poles further rearward at the end of the stoke, or both.

Of major significance, with respect to "double" poling, it was found that the rider could vary, without apparent awareness, the amount of force applied to one pole or the other to compensate for imbalances caused by uneven poling, or shifts in the rider's position with respect to the vehicle, or variation of the riding surface. This previously unrealized effect seems to complement the two-wheeler effect of correcting for tilt by turning the forward wheel in the direction of the tilt. The meaning of this important discovery is that poling can be more than just the means of propulsion; it can also be an integral part of a complex balance and stability system, with a feedback loop which includes the rider, vehicle, and poles that operate together to help control the vehicle's ride as it travels on.

The discussion so far has dealt with "double" poling, which is characterized by the use of both poles in unison. Another basic poling category is the "alternate" where the poles are alternately used back and forth, first poling on the one side, then the other, there being a resemblance between the actions of the poles and those of a walker's legs. The "alternate pull", and the "alternate push", and the "alternate pull-push" are the counterparts to their respectively named stroke in the "double" poling category; and the comments previously cited that pertain to the "double" strokes apply to their "alternate" stroke counterpart, except for one important difference: Unlike "double" poling, with "alternate" poling the torque produced by the one pole does not cancel out that which is produced by the other.

When the rider propels the vehicle forward, the force which is applied to the poles is in a direction that is parallel to the vehicle's longitudinal axis; and hence, most of the power that is produced is in line with the direction of travel. But because the poling force is offset from the axis itself— the pole tips are set on either side of the axis separated by the width of the rider's shoulders—a potentially destabilizing moment is also produced. The thrust of a pole has a tendency to produce motion, or torsion, about the rider's body—think of a canoe twisting side-to-side when paddled. When poling on the vehicle's right side, the force that the rider exerts on the pole to propel the vehicle forward will tend to twist the rider's body counterclockwise, or in the case of left side poling, clockwise.

This destabilizing moment can upset rider and vehicle if not countered by an opposing action, such as an opposite force of equal magnitude as illustrate in the "double pull" example, where the moment produced by the one pole is cancelled by that produced by the other. And indeed, this is true for the entire "double" poling category where right side and left side poling actions are in unison; and consequently, the opposing moments that result tend to counteract each other. This is not true, however, for "alternate" poling. In this case every stroke must be countered by the rider to prevent the resulting moment from upsetting the vehicle. The rider creates this counteraction by either leaning, or by turning the vehicle's forward wheel, or some combination of these actions, or some other maneuver that works.

Whatever that opposing action is that the rider employs to counteract the torque caused by an "alternate" stroke, it can be repeated for successive strokes to form a continuous pattern or rhythm which the rider may find interesting. For instance, the vehicle can be made to oscillate back and forth side-to-side, or the rider could sway or twist back and forth. Any of the various strokes in the "alternate" poling category can be used to "walk" the vehicle in this manner, provided that the rider produces a corresponding opposing action. That same feedback loop which was referenced to the "double" poling category applies here for "alternate" type strokes; whereby the rider intuitively balances the torque caused by the "alternate" stroke with that generated by the opposing action.

Alternative Embodiment

Figure 8:
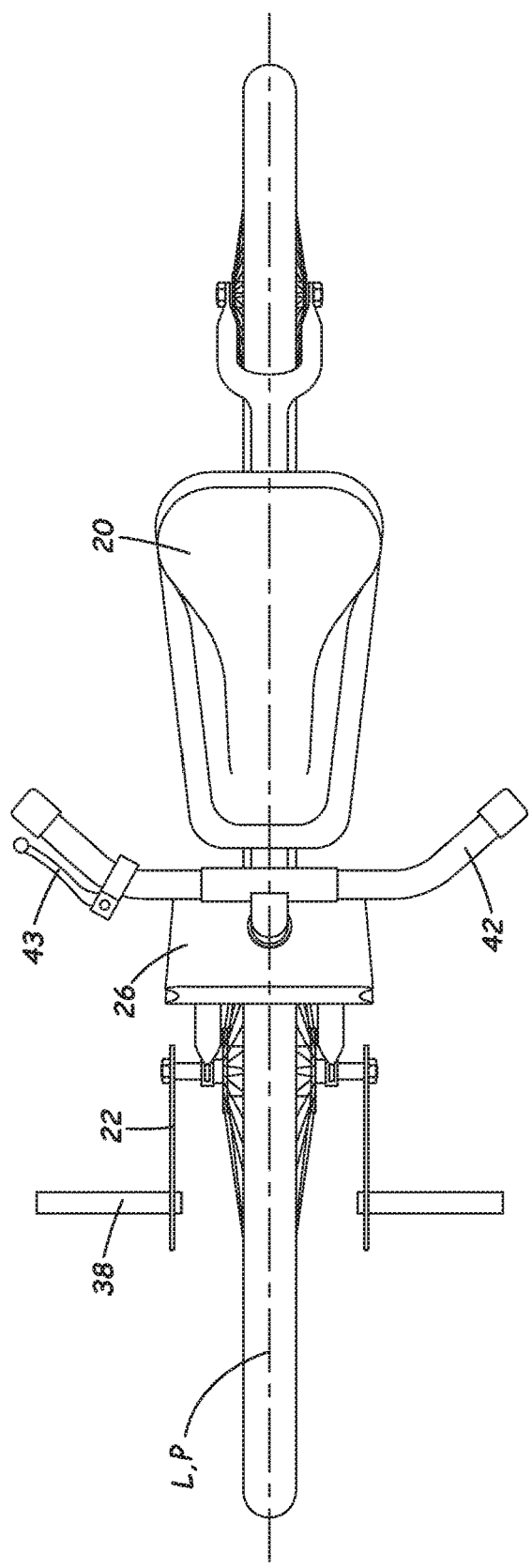
FIG. 8 is a top plan view of another preferred embodiment of the vehicle of the subject invention.
Figure 9:
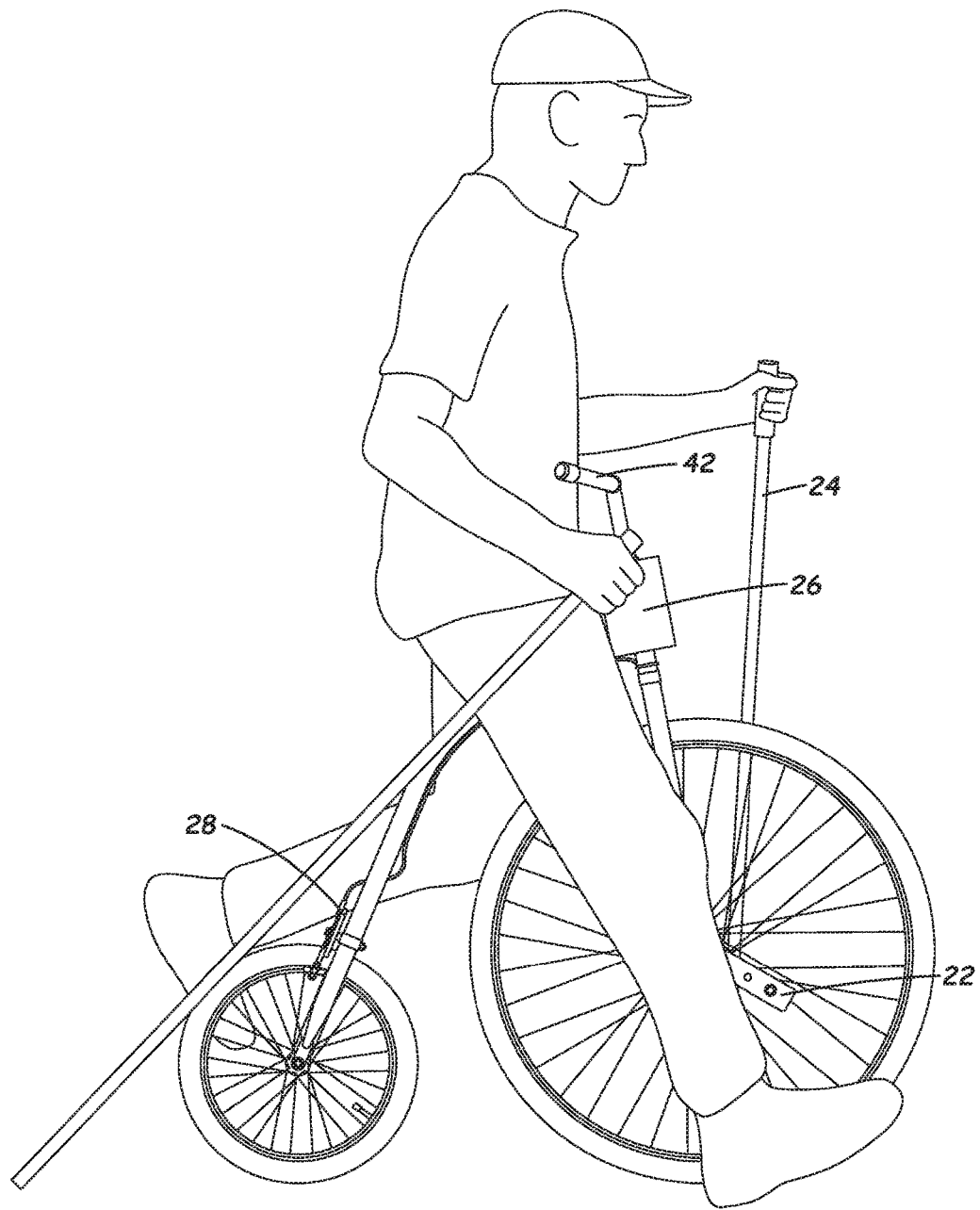
FIG. 9 is an environmental view of the preferred embodiment of the vehicle shown in FIG. 8 showing a rider with poles seated on the vehicle.

An alternative embodiment of the subject vehicle is shown in FIGS. 8 and 9. While this embodiment can be propelled by poles it can also be propelled by the feet of a rider pushing against the ground on opposite sides of the vehicle's longitudinal axis. Propelling with the feet can provide greater thrust and thus make the vehicle more versatile. Hence, it can be ridden over more varied terrain where otherwise the inadequate propulsion generated by poling alone would make it difficult if not impossible to precede, like up inclines for instance. A rider can drop their feet to the ground and walk or run while seated on the vehicle without impeding their progress. The greater speed range and varied maneuverability of this alternative embodiment add interest and challenge to the riding experience. And for those that may be so inclined, it can provide a more complete workout that includes the exercise of both the rider's upper and lower body.

Said alternative embodiment can be operated exactly like the preferred embodiment as described up to this point, and as illustrated in FIGS. 1-3. Hereafter this mode of operation is referred to as being ridden or operated "Feet Up," indicating the rider's feet are in place being held by the footholds and the vehicle can be propelled exclusively with poles. When the vehicle is ridden in a manner whereby the rider propels it with their feet, or with the poles and their feet together, it may be referred to as being operated "Feet Down," meaning that it is capable of being operated, or is being ridden, in a mode wherein the rider's feet make contact with the ground. The vehicle can also be operated in said walking mode. It should be noted too that the vehicle can be powered by a electric motor as described herein.

A two-wheeled vehicle that is propelled by the feet may call to memory the draisine, which was the forerunner of the modern day bicycle, invented in 1817 by Baron Karl von Drais. (For reference pertaining to the draisine see: Bicycles and Tricycles, Archibald Sharp, 1896, p. 147, MIT Press edition 1977; and Bicycling Science, third edition, David Gordon Wilson, 2004, pp. 10-11, MIT Press, 2004). An embodiment of the subject invention that supports propulsion by use of a rider's feet, however, is optimally configured for such propulsion when the front wheel has trail and can be controlled by a torso brace, which can control the direction of the front wheel without use of the rider's hands. Neither of these features is present in the draisine. Although similar "balancing bikes" are available today, which are used as trainers usually by children, these cycles are not intended for hands-free operation and require handlebars.

It may be noticed that the original embodiment as shown in FIGS. 1-3 is similar to that of the alternative embodiment as shown in FIGS. 8 and 9 except for the addition of a torso brace 42. Although the two embodiments can share one configuration which includes a saddle 20, the torso brace is not used while riding Feet Up; and the footholds 22 and accessory contract means 26 are not used while riding Feet Down. When the vehicle is being ridden either Feed Up or Feet Down, a rider is able to hold the poles 24 raised above the ground, and at the same time make contact with the vehicle using their hands and can, for instance, operate a brake hand-lever 43 that is attached to the torso brace 42 and thereby actuate a brake 28 (or one that operates on the front wheel). It should be noted that the poles can be dispensed with altogether, and a rider can still operate the vehicle by propelling it solely with their feet. And when doing so, the rider's arms can move about freely, but would most likely tend to sway to and fro as they naturally do when walking and running; or the rider could place both hands on the torso brace and operate the vehicle as if it were a draisine.

The Torso Brace

According to the invention, the primary function of the torso brace is to enable a rider to directly influence the direction—that is control to some extent the orientation—of the front wheel, and thereby assist a rider in steering the vehicle while it is being propelled by their feet. Although the torso brace may appear to be an alternative means to handlebars that can be used by a rider to dominate the vehicle like in the case of a bicycle, the scope of its use is much more limited, as explained herein. It should be noted, the torso brace does not necessarily have to be continuously engaged. It should also be realized that a torso brace is not a means to stabilize a rider on the vehicle as in the case of an accessory contact means; nor is it a substitute for the loss of footholds as a means for modulating torque at the steering axis. Nevertheless, a means such as the torso brace, or the like which provides an equivalent function, can be essential in the Feet Down operation of said alternative embodiment.

A torso brace, or the like, provides the means by which the rider, without using either their arms or their legs, can directly control said steering angle through the contact of their body with a part of the vehicle that connects with the forward structural member. With all limbs otherwise engaged in propelling the vehicle, those remaining parts of a rider's body available to adapt to the task of interfacing with such means are what is left—the head, neck, shoulders, torso and hips. The rider's torso was selected as the most suitable for the task, though those skilled in the art may find the other alternatives could serve as well. By way of example, a torso brace 42 can be a shaped bar that connects to the forward member 10. A torso brace can also provide the means for the rider to push against in order to counter the inertia of the vehicle to its forward progress, which could also act as a stop that prevents a rider's buttock from slipping too far forward on the saddle. According to the invention, the rider can engage the torso brace, or the like, with their body while either propelling the vehicle solely with their feet, or propelling it with the feet and poles together.

It should be understood, the two functions of the torso brace as illustrated herein, or the like, can be separated; and the steering function can be performed by alternative means that has the singular purpose of controlling the orientation to the front wheel by use of a part of a rider's body other than a limb. And in that case, additional means can be employed which restrict the movement of the rider's body with respect to the vehicle—that is prevent or stop the rider from sliding forward—when pushing their feet against the ground. In general, this function can be provided for when two conditions are met: the rearward member 14 supports mass of a rider's body, and that mass can be prevented from moving forward with respect to the rearward member. In the example of said alternative embodiment, these conditions are being met when that mass of the rider's body which is continuously supported by the saddle 20 is stopped or prevented from moving forward on the rearward member by the rider's engagement of the torso brace 42.

The most advantageous location for the torso brace is slightly forward of the rider's abdomen, which allows the brace to be easily engaged when riding Feet Down, but puts it out of the way when riding Feet Up. Keep in mind the torso brace is connected to the forward member, so whether it is engaged or not it moves about with respect to the rearward member following the pivoting movements of the front wheel. In one embodiment for example, as shown in the FIGS. 8 and 9, the brace can resemble a small handlebar: being a bowed shaped bar more or less a foot in length, which connects to the stem of the front fork by an adjustable means that can vary the bars position with respect to the rider. The concave bar can be shaped to contact the sides of a rider's abdomen and can be adjustable vertically and or horizontally or otherwise to meet the rider needs and preferences.

A rider can control the position of a torso brace—that is its angular orientation with respect to the rearward member—by pressing their abdomen against it, which if held steady can prevent the front wheel from changing course. To cause the front wheel to pivot, the rider can manipulate the torso brace by swaying and or twisting their upper body in such a way that one side or the other of the brace—that is said bowed shaped bar in the given example—is thereby nudged forward. According to the invention, that means that is linked to the forward member by which a rider can directly control the direction of the front wheel by varying said steering angle through their contact with said means, operates by that force that emanates from the rider's body and passes through a part of the body which is located on the one side or the other, that part being other than a part of a limb. It should be understood that the rider's interface with a torso brace, or the like, is not necessarily positive in the sense that the brace is continuously and firmly in contact with a part of their body that is associated with particular muscles that permit its use, as in the case with other means used for similar purpose, such as handlebars or footholds for instance.

The degree of response in movement of that means by which a rider directly controls the position of the forward member—that is the steering angle—can be selectable or adjustable to meet the preference of a rider. In the example herein of the torso brace, its movement does not have to correspond one-to-one with the pivoting of the front wheel. Said bowed shaped bar for instance, can be pivotally connected to the rearward member, and through a mechanical linkage or gears which link it to the forward member, a rider could control the degree of change in steering angle for a given amount of movement of their body. It should be noted, the direction in which the front wheel pivots could be either to the left or right in response to a rider's movement, however, it seems more natural that it corresponds: twist clockwise or push the left side of said bar forward makes the wheel pivot to the right or clockwise, and vice-versa. It also seems more natural that that action, which is performed by the rider's body on or to said means that causes the front wheel to pivot in a particular direction, be performed by the opposite side of the rider's body to said direction, although the opposite case could be implemented without departing from the purpose of said means.

Importance of Trail

It should be realized that when a rider drops their feet from that position forward of the steering axis in order to use them to push against in the ground, a major factor for controlling the vehicle is no longer accessible: Without the mass of the rider's legs bearing on the foothold, said "second method" produces little if any torque about the steering axis in reaction to the tilting of the vehicle. Moreover, it was evident during early experiments that the employment of such means as a torso brace, or the like, for purposes of controlling the vehicle when riding Feet Down, could only partially compensate for the loss in capability due to the lack of said torque. To overcome this problem, and help improve the vehicle's handling in general when riding Feet Down, certain control factors that were not required, or that were not necessarily considered vital in Feet Up riding, must be brought to bear during operation of said alternative embodiment.

These control factors rely on the "trail" associated with the front wheel 12; and though trail is usually present in the design of most two-wheel tandem vehicles, it is not considered vital to their operation. Trail, which is determined by the setup of the vehicle's forward member 10, can be created by slanting the steering tube 17 rearward in that plane that includes the steering axis S and the rear wheel point-of-contact 37 with the ground. Accordingly, in the invention the forward member is configured such that the front wheel point-of-contact 39 with the ground falls rearward of the point at which the steering axis intersects the ground. In said alternative embodiment there are two essential control factors that rely on trail; and together in conjunction with the use of the torso brace, they are sufficient to enable a rider to control the orientation of the front wheel when riding Feet Down.

A first factor, which is based on said "first method", also utilizes torque which can be generated about the steering axis in response to tilting of the vehicle. According to the invention, while at the same time that a rider's legs are being used to propel the vehicle forward, they can also be used to simultaneously control and vary said tilt angle. It may be noticed that when the rider tilts the vehicle it is the vehicle itself (and not the combination of rider and vehicle together as in the case then operating Feet Up) that is being balanced by the rider's actions. A rider can maneuver their lower limbs in a way whereby the inclination of the rearward member is controlled though the lateral pull and push against the saddle by that part of the legs that make contact with the sides of the saddle due to the saddle's position in the rider's crotch. It should be noted however, a rider could, alternatively, push and or pull in the same manner against a means that may be substituted for the saddle provided that such means meets the two conditions. In either case (which is also the situation when riding Feet Up), the center-of-mass of the rider would be supported forward of the rear wheel axle (or rear wheel point of contact with the ground) and rearward of the steering axis (or steering tube).

Testing shows that the influence of said first method on the operation of the vehicle when riding Feet Down is much less effective than that which is based on said second method when riding Feet Up. Nevertheless, even though the use of said first method cannot be considered equivalent as a replacement for the loss of the latter, said first factor is vital to the performance of said alternative embodiment. It is important to understand that because said first method is only effective over a small range of variations in tilt angle, by itself the ability to control the tilt angle is not sufficient in most situations to allow the rider to adequately steer the vehicle, and therefore the value of said first factor may be dependent on its employment in conjunction with the engagement of the torso brace, or with that of a second factor, as explained herein.

It should also be realized that because a rider's interface with a torso brace, or the like, is not necessarily firm and positive (like handlebars in comparison), the usefulness of said brace is greatly enhanced when torque that is associated with said trail is present. Without the aid of this torque about the steering axis, which is a product of said first method, the vehicle will handle poorly and be difficult to operate while propelled by the rider's feet. The torso brace was found to work well when that point at which the steering axis intersects the ground is three to four inches forward of the wheel's point of contact with the ground, as depicted in the figures of the application. Without any trail, which would be the case when said points coincide, the rider will struggle to control the vehicle, and will be forced to maintain continuous contact with the torso brace.

It is of interest to recall from earlier discussion herein, that because control of that embodiment meant exclusively for Feet Up riding is based on said second method, such a vehicle does not rely on trail, though trail may improve its handling. That torque which is generated about the steering axis due to the second method however, is also controlled by the tilt angle, as in the case with said first factor. Consider a rider operating Feet Up: That mass of the rider which is deposed in said plane and supported by the rearward member dominates that center of mass that revolves about the vehicle's longitudinal axis. A second center of mass that is located in the plane of the front wheel and revolves about the steering axis is dominated by the considerable mass of the rider's legs. And because the two axes about which said two center of mass revolve are orthogonal to each other, it should be understood therefore, that that moment produced by the force of gravity acting on said second center of mass tends to generate said torque about the steering axis when the cycle inclines laterally. That is, as the tilt angle changes in direction or degree to follow the position of said first center of mass about said longitudinal axis, the steering angle tends to follow due to the effect of said torque, which tends to pivot the front wheel. Thus it is clear that the course in which the vehicle travels tends to deviate to the direction in which said first mass shifts—that is the rider.

Use of Torsion

A second factor, which is dependent on said trail, is the application by the rider of torsional force to the rearward member. During testing it was noticed that under certain conditions said embodiment was slow in responding to direction given by the rider: Engagement and use of the torso brace together with tilting of the vehicle could not alone cause the vehicle to turn rapidly and or sharply enough in many situations. It was discovered that in these situations the vehicle could be made to respond more satisfactorily by twisting the saddle, which the rider was capable of performing with the use of their legs and feet. According to the invention, the torsion that a rider is able to apply to the rearward member when thrusting their feet against the ground can be an essential aspect in the steering of the vehicle.

It may be noticed that controlling the vehicle by this method is similar to that by which it is steered when operated in said walking mode. But instead of twisting the saddle by hand, the torsion is applied by twisting the rider's body with their buttock fixed to the saddle. This can be accomplished when using a suitable saddle, as illustrated in FIG. 8 for example, which includes sides that can be contacted by the rider's inner thighs in order to apply lateral force. In general, the application of said torsion requires that that mass of a rider which the rearward member supports stays fixed in position—that is, the means that provides this support of said mass resists the torsion—as the rider's body is being twisted with respect to the ground. It is important to note, the center-of-mass of said mass be located: in said plane, forward of the rear wheel's point of contact with the ground (or axle), and rearward of the steering axis. As a result, torque can be generated about said center-of-mass and transmigrated from the body of a rider to the vehicle's rearward member, which in effect puts lateral force (parallel with the ground and normal to the direction of travel) at the steering tube; and because the rider can prevent the vehicle from rotating about the longitudinal axis—that is the rearward member is held more or less upright—this force tends to cause the rotation of the rearward member about said point of contact of the rear wheel with the ground, which makes the front wheel tend to pivot about its point of contact with the ground in a direction corresponding to the twisting of the rider's body.

When steering the vehicle by employment of said second factor, the use of poles and that of the torso bar, or the like, are not necessarily required since the input to the vehicle can be provided entirely through the use of a rider's body. Although complex, the maneuver can be intuitively performed by using the legs: As the thrusting action of the legs propels the vehicle forward, they also balance the rearward member, which is being held between them in a near vertical position—ideally. And as they do so, depending on the desired direction of the turn (either to the left or right of the longitudinal axis) the rider's body sort of also simultaneously twists the rearward member by applying torsion to that means which connects the rider to the vehicle—that is the rider's interface with the rearward member located between the rear wheel axle and the steering axis—which can be the saddle as shown in the example of said embodiment. It should be noted, said means is required to resist said torsion when applied in a plane substantially parallel to the surface of the ground.

The pivoting of the front wheel, that is what appears to be its rotation with respect to the steering axis, is actually the wheel revolving about its point of contact with the ground, which is rearward of the steering axis. This reaction to the twisting of the rearward member is caused by said lateral force (described above) acting on a lever arm which is in fact said trail. When this happens, the forward member tends to swing about a radial path with its center being said point of contact. And as it does the vehicle proceeds on a curved path forming an arc with a shape that can be controlled in part by the amount of torque that the rider generates with their body, which the rider controls by twisting their body as their feet strike the ground. The feet provide traction against the ground which allows the rider's legs to apply rotational leverage to the rearward member through their contact with the sides of the saddle. The effect works best when the tilt angle and steering angle are small.

The form of the saddle best suited for transmigrating torque from the rider to the rearward member differs from that which can be used in Feet Up ridings, where a rider's buttocks simply sits on the top surface while being held in place by gravity and the thighs, which are extended forward horizontally pressing against accessory contact means. With the thighs extending downward during Feet Down riding, the sides of the saddle must also extend downward in order to be in position to be engaged by the inner thigh of the leg and thereby allowing them to twist the saddle. The saddle can take many forms, even one where its sides are moveably attached (whether directly connected to the body of the saddle itself or its mount) so that that part of the saddle which stays in contact with the thigh moves back and forth, or pivots, with the movement of the thigh during each stride and allows said torque to transmigrate to the rearward member. Nevertheless the same device can accommodate both riding modes. Special consideration, however, must be given to the design of the saddle as it pertains to comfort of a rider's rump when operating Feet Down so as to mitigate aggravation due to the saddle's position in the rider's crotch.

It should be noted that this same process of applying torsional force—that is said second factor—is at work in Feet Up operation when a rider applies lateral force to one side of the rearward member via an accessary contact means. With the weight of the rider pushing down on the saddle, and one inner thigh pushing against an accessary contact means, the rider can apply said lateral force to the steering tube. And the front wheel will tend to pivot, provided said lateral force is prevented from tilting the vehicle, which may require the use of a pole and a little body English. When the vehicle is tilted to one side and the rider wishes to steer to the other, that pole on the one side can be pushed laterally against the ground while the inner thigh also pushes on the accessory contact means on that side of the steering tube, and the front wheel will tend to pivot toward the other side of the longitudinal axis as the center of gravity of the rider rises. In actuality, this maneuver may likely be subtly combined with others.

Referring to that section that discusses propulsion with poles, the torque which is generated about a rider as a result of poling can also be used to aid in steering the vehicle. In Feet Up operation torsion produced in the upper body resulting from pushing a pole against the ground can be transmigrated to the rearward member causing the same effect as that described above. It may be noticed in Feet Down operation that a rider may be able to more effectively twist their body with the aid of the poles, again demonstrating that use of poles can influence the balancing and steering of the vehicle. According to the invention, poles can assist a rider in the control of the vehicle, and except during said walking mode, they can be used to do so intuitively in conjunction with other methods and means of operating the vehicle, including said first and second factors.

Stance and Position

That part of the rider-vehicle interface that supports the rider's weight on the rearward member, herein referred to as the saddle, can vary in form; and through the same means, or certain parts thereof, can be used for either mode of the vehicle's operation, whatever those details of its design may be, its usage differs between the two. In riding Feet Up, the rider maintains a typical seated position, with their buttock centered on the back part of the saddle and their thighs raised horizontally. The buttock is fixed on the saddle and prevented from moving by the thighs, which can be held rigidly against the accessory contact means by contraction of the inward-thigh muscles. As illustrated in FIG. 4, the accessory contact means can be integrated with the saddle. When riding Feet Down however, the thighs are in motion with the saddle wedged between them, and the rider's leg muscles work as they would when walking or running. The thighs must also be able to contact the sides of the saddle in a way that allows them to torque the rearward member. By way of example, FIG. 8 depicts a saddle that encompasses all of the requirements mentioned above.

In order to accommodate changes in operating technique when riding Feet Down, a rider is able to shift their longitudinal position on the saddle. The utmost control is afforded when a rider's buttock is positioned forward on the saddle, which allows the abdomen to engage the torso brace, thereby enabling the rider to maneuver their body against said brace. In this "forward position" support of the rider's mass is distributed between the ground, saddle, torso brace, and poles when used; and that mass can be shifted about without upsetting the vehicle. Depending on the dynamics of the rider's stride, which are primarily affected by the speed of the vehicle, the amount of weight that bears on each foot continuously fluctuates from nothing when the foot is raised off the ground, to an amount that can be a significant portion of the rider's total weight when the foot impacts the ground. However, the distribution of that weight supported between both feet stays more or less constant, and as a result, the portion of a rider's mass which is supported by the saddle remains constant, which can be particularly helpful in the handling of the torso brace—not to mention the comfort of a rider's buttocks.

Depending on road conditions and a rider's level of skill, the vehicle can be controlled indirectly without engaging the torso brace, at least for short intervals. In doing so, a rider sits more upright with the buttocks positioned further back on the saddle, which permits the upper body to sufficiently twist and sway without interfering with the torso brace in order to steer the vehicle solely by use of said control factors. In this "rearward position" the saddle supports a major portion of the rider's mass as their feet alternatingly contact the road as they propel the vehicle forward. Because the only contact with the vehicle is through the saddle, the rider must therefor control the vehicle by either tilting the saddle sideway, or applying torsion to it, or some combination of the two, which a rider can do intuitively when maneuvering their body as herein described. It should be noted that the amount of weight that bears on the saddle stays constant, which is important, otherwise unwanted fluctuation in the generation of torque can result.

It is important to realize a single configuration of the vehicle can encompass all features and unique aspects of both preferred and alternative embodiments of the subject invention. And that vehicle can operate when employing the various techniques mentioned without compromise, though the two modes of operation—Feet Up and Feet down—are distinct, and necessitate that a rider maintain fundamentally different stances in each case. Although the use of poles may appear to unite the two modes, the purpose of their use and feel of operation is very different in each mode. However, from the perspective of a user the two riding modes are in many ways complementary, and if each mode of operation were representative of a separate category of cycles, each vehicle type would be lacking in comparison to that which encompasses both modes. Nevertheless, a vehicle that does not encompass the Feet Up mode can be design solely for Foot Down operation as described herein, wherein the stance and position of the rider differs; and that vehicle can be dramatically different in its appearance.

It should be understood that features can be added to the vehicle which can permit the rider to temporarily change or alter their basic operating stance in the one mode or the other, or to that vehicle which only encompasses the one mode. For example, leg-holds can be attached to the rearward member (placed on opposing sides of said plane) for use during Feet Down operation, wherewith the rider can rise their feet and place them on said leg-holds, and thereby stabilize their body on the vehicle while still being able to ride with sufficient control by engaging the torso brace—and if desired, employing the poles. The use of such leg-holds—which could be located over the rear wheel so as not to interfere with the rider's stride—would necessitate that the legs be bent sharply backward at the knees in a position similar to that as a runner's leg would appear just prior to its forward stoke. Though awkward, rear leg-holds may find their place, if only for short durations during competitive racing, like when coasting downhill at speeds that otherwise would exceed the capability of the vehicle to be safely operated. Leg-holds, and such rearward mounted footholds, can include additional means configured to be operable by the foot of the rider whereby the speed of the vehicle is arrested.

Setup

It may be noticed in the Feet Down mode of operation the location of footholds can place them directly in line with a rider's stride. And, it is also possible for a rider's lower leg to hit the front wheel if turned too sharply. These conditions can be easily dealt with by a rider mindful of the vehicle's limitations. Nevertheless, in light of the discussion herein, it should be understood that the vehicle's design can be modified without compromising its handling; and those details of implementation that may cause disadvantage due to the rider's interface with the vehicle can be mitigated. In this regard the functions of a torso brace could be separated; and dealing separately with that aspect by which a rider directly controls the orientation of the front wheel, various forms of the device may be devised that could more advantageously accommodate a specific place of contact on the rider's body for the purpose intended. It should also be understood that in an embodiment intended exclusively for Foot Down operation, the saddle, or other such means of rider-vehicle interface as described herein, can be positioned further rearward by extending the vehicle's wheelbase.

It may be noted in Feet Up operation the resistance or inertia to the forward motion of the vehicle's mass is handled through a combination of the rider's contact with the saddle and the footholds. In Feet Down operation, according to the invention the mass of the vehicle can be pushed or pulled along in the direction of travel by the rider through a connection to, or contact with, the vehicle and a part of the rider's body other than a limb; and this interface can be exclusively with the rearward or the forward member, or it can be the result of both; and it can change during the course of a ride from the one member to the other, or from one to both or vice versa, by actions of the rider. It should be noted that without the aid of the torso brace or some other means of contact with the forward member to push against—that is when a rider relies exclusively on the rearward member for such purpose—contact with the saddle alone may not always be sufficient, and therefore either the saddle could be modified, or other means can be attached to the rearward member for this purpose.

In Feet Up operation, the means that support that portion of a rider's mass carried by the rearward member—that is in support against the force of gravity—positions that support in said plane. Said means, which can be a saddle as shown in the drawings, has only this single function. However, the situation is more complicated when operating Feet Down, where the mass of a rider is not required to be located in said plane, and where the rider's legs, and the interface which they form with the rearward member and the ground, are a critical part of the function by which a rider controls the vehicle. According to the invention, the rider can be supported by, or otherwise connected to, the rearward member by means which support their mass and enable performance of those actions that are associated with the control of said first factor and said second factor—that is the application of lateral force and torsional force to the rearward member. In both modes of operation, that means can be the same, as illustrated in the drawings for example.

It should be noted, in a two-wheel tandem vehicle designed for Feet Down operation, said means above can include diverse elements provided their arrangement allows those forces applied to such means by a rider's body produce the equivalent affect in controlling the vehicle. Instead of a single device such as a saddle, the rider could be supported by various other means that may involve multiple points of contact between rider and rearward member, where one point or set of points which form such contact supports weight of the rider, while another point or set of points allow the rider to apply torque, and yet a third allows for the tilting of the vehicle. With such an interface for instance, the rider's mass can be held by the one part, which could include straps that support weight for example, while those other parts that are used to receive input from those actions from a rider's body associated with said control factors can be located peripherally along the sides of the body instead of between the legs. It could also provide the contact between rider and rear member by which the mass of the vehicle is moved; and it may be feasible too, that this same interface can incorporate the function of an accessary contact means. The vehicle could include a torso brace, or it may not if sufficient control can be afforded by said first and second control factors alone.

It should be understood that the vehicle, whether designed exclusively for Feet Up or Feet Down operation, or one that encompasses both modes of operation, can incorporate an electric motor that can drive the front or rear wheel. The battery for the motor can be conveniently attached to the rearward structural member disposed in said plane; and the motor's controls can be located on the torso bar, for example. And during that period in which the vehicle is being propelled by the motor, the poles can be held temporary by clips which fasten to the vehicle so as not to interfere with its operation, and thus allow the rider to grip the torso brace and thereby operate the vehicle in a manner like that of a conventional motorbike. It should be noted that the lever for a handbrake can also be attached to the torso brace. Remote controls for motor speed and a power brake can also be located on the poles, which would allow a rider to control the vehicle—if only used intermittently in Feet Up riding—where for instance pressing a button on the right pole momentary applies power, and a button on the left pole slows the vehicle.

Handling and Control

It is apparent from testing that the handling of the vehicle, and the control that the rider can exert over it when propelled with their feet, can vary widely from that when propelled solely with poles. As explained earlier, when riding Feet Up the vehicle is being operated—that is ridden with the rider in control—as a result of the rider's successful management of three variables—speed, tilt angle and steering angle. And as with all two-wheel tandem vehicles, at any given speed, when the tilt angle and steering angle are not in equilibrium the vehicle will not remain upright without the immediate intervention of the rider. When the vehicle is ridden Feet Down however, it is not being operated in a manner that is consistent with this requirement, and therefore the relationship between a rider and the three variables which govern its operation when riding Feet Up does not apply under certain conditions, or may only partially or intermittently apply.

The explanation for this difference lies in the fact that the rider's mass is stabilized with respect to the ground when riding Feet Down instead of on the vehicle's rearward member, as it is when riding Feet Up. In Feet Down riding the rider's legs can prevent the rearward member from leaning, and thus interrupt the natural swaying of the vehicle about its longitudinal axis in reaction to centrifugal force which is generated when the vehicle is not heading straight ahead. And since centrifugal force is proportional to the square of the velocity, vehicle speed is not the significant dynamic that it is in Feet Up operation. The disruption of said relationship above and that ability of a rider to influence the steering angle by using their feet against the ground, including leveraging their legs to produce torsion about the rearward member, are major characteristics in the handling and control of the vehicle in Feet Down operation.

It should be realized that said first factor, which is based on tilting the rearward member, and said second factor, which is based on applying torsion to the rearward member, work independently in regard to their control of the steering angle. A rider is able to apply the necessary actions to cause either effect—that is tilting the vehicle to the left or right of its present inclination with respect to the longitudinal axis, and or twisting the rearward member either clockwise or counterclockwise—at any time. Said factors work best for small tilt angles and steering angles; and they can be performed by the rider either individually or together in varying degree in order to produce the desired effect—that is to urge the front wheel to bear to the right or the left with respect to its present direction. The poles and the torso brace can also be in play, and either one or both can be employed to contribute to these maneuvers. It should be noted that the effect of gyroscopic motion, may be at work here too.

The effect of gyroscopic motion is an important aspect in the handling and control of the vehicle in Feet Down operation, particularly when riding in said rearward position where the rotation of the forward member about the steering axis is not restricted by the use of a torso brace or the like (or footholds as in the case of Feet Up operation). Noting that said motion is a function of the angular momentum of a spinning wheel, tests were conducted using varying weighted rims on the front wheel, and the affect between using a light weight rim and that of one three and a half pounds heavier was dramatic. Even with the torso brace engaged the difference in handling was significant, especially at higher speeds where the predominate factor of said motion (which is based on the square of the vehicle's velocity) is so pronounced. It should be noted, a large diameter front wheel in an important factor (27 inch diameter was used for the test).

During testing of the Feet Down operation of the vehicle, it was confirmed that each of the three basic techniques by which a rider can manipulate the orientation of the front wheel, as disclosed herein, is an essential part in the overall control of the vehicle; and together, they can be performed intuitively to the degree necessary that correctly affect the balancing and steering of the vehicle. The effectiveness of those dynamic actions required to employ said techniques—as demonstrated by the tilting of the saddle and the twisting the of saddle to indirectly control the steering angle, and the pushing against the torso brace to directly control said angle—are dependent on the degree to which the rider's body matches or fits the vehicle. Therefore it should be understood, a sufficient range in the adjustability or variation to those parts of the vehicle which must accommodate the different size and weight of various riders, particularity in respect to the saddle, or that alternative means which may be used to perform the same functions, and torso brace or the like, is acceptable provided such variation and adjustability does not adversely affect the handling and control of the vehicle.

It should also be noted that the mass of the forward member, which revolves about the steering axis, can have a greater affect in the handling of the vehicle during Feet Down operation than it has in the Feet Up mode, where the weight of the rider's legs bearing on the foothold dominate the forward member. Weighs can be attached to the forward member to help compensate for the loss of weigh of the legs when riding Feet Down. Several pounds placed half a foot or so forward of the steering axis can make steering more responsive to said tilt angle, and can result in less oscillation of the steering angle in straightaways. Distance of the weight from the steering axis could be adjustable too, all of which could be especially important in high performance cycles used in competition. Said offset of the front axle could be implemented instead to take advantage of the heavier wheel needed to enhance said gyroscopic motion, however the use of offset may results in trade-offs since offset affects said trail. In any case, the mass of the forward member can be tuned—that is its position and size of its mass can be varied with respect to the steering axis—for optimum performance of an individual rider.

Operation and Riding

A rider can begin a ride either Feet Up or Feet Down, and under most conditions, switch at will while under way from the one mode to the other. When starting out Feet Down, the more practical way would likely be in said forward position, where leaning into the torso brace offers the most control of the vehicle and consequently affords the greatest latitude in riding conditions. The rider can start out at any desired pace, walking or running, while at the same time poling in unison with the stride of the legs, although use of poles is not necessary. Movements involved in steering are perfectly natural: To steer to the left, for example, the rider pushes the saddle to the left using their legs, causing the vehicle to tilt, while at the same time twisting their torso in the same direction (counterclockwise) forcing the right side of the torso—the abdomen in this case—to push against the right side of the torso brace and thereby moving it forward.

On level ground a rider may also choose to start out riding in said rearward position, which generally requires the use of the poles to augment the thrust generated by the legs as well as aid in balancing the rider's mass on the saddle. When in this position, the rider's legs sort of paddle their feet against the ground, but produce much weaker trust than that from their pushing action when in the forward position. And the torso brace is not engaged, so said first and second factor are used exclusively to steer and balance the vehicle. On good pavement the vehicle can be safely ridden in this relaxed and casual manner, especially at slower speeds and over straight or slightly winding stretches. At any moment the torso brace can be engaged if needed by shifting to the forward position.

In switching from the rearward to forward position, as the rider's buttock slides to the front of the saddle, a considerable amount of weight is transferred from the saddle to the rider's feet. The maneuver can be easily performed by leaning the torso forward while sort of stepping ahead with respect to the vehicle, using the combined pushing action of the feet and poles to move forward until stopped by the torso brace. This can be accomplished during a signal pole stroke, either with the one pole, or two used in unison. Going from the forward to the rearward position requires greater skill and the use of the poles, and is best attempted at slower speeds. Although the movements and actions involved in these maneuvers seem complicated, and may be difficult to describe, their execution is performed intuitively without noticeable disruption of control. To an observer, in either position the rider's actions—that is the motion of their legs and arms—could appear as one does when walking with poles, where opposite arm and leg move in unison, although when using other poling strokes the rider may resemble a Nordic skier.

When switching from Feet Up to Feet Down, the act itself of dropping the feet to the ground from their position on the footholds can place the rider in said forward position whereby the torso brace can be instantly engaged. And in that moment, a rider's legs can instantaneously pick up the pace that corresponds to the speed of the vehicle, while at the same time applying the correct amount of lateral force to the saddle to produce the desired tilt angle, which may in turn require the application of force to the torso brace to vary the steering angle in order to maintain the vehicle's balance. These actions, together with the uninterrupted use of the poles, including completion of the stroke in progress, can all be automatically performed by the rider. When a rider transfers from Feet Down to Feet Up operation, the poles are used to maintain balance while the legs swing forward with the feet rising to the footholds, which then allow the thighs to make contact with the accessory contact means, as the poles continue thrusting the vehicle forward.

It is important to realize, unlike in Feet Up operation where the mass of the rider is supported exclusively by the vehicle (excluding that which may shift to the poles), in Feet Down operation support of a rider's mass can be distributed between the vehicle and the ground. It is this distinction between the operation of said alternative embodiment and other two-wheel tandem vehicles that is the determinant of the invention's unusual operating characteristics. It is also the reason for the mechanical advantage afforded to a rider when operating in said forward position while riding Feet Down, which permits a rider to propel their mass with considerably less effort but speedier compared to that of a walker or runner, where the person's full weight bears entirely on the ground. It is the feeling of running downhill. The affect, perhaps, may be compared to that of walking and running on the moon, where the diminished force of gravity gives the feeling of gliding effortlessly. Indeed, a vehicle designed exclusively for Feet Down operation, one without footholds or accessory contact means, or poles, can be viewed as a "running machine."

The speed at which the rider progresses is mainly determined by the pace at which the rider's legs propel the vehicle, but can with less effort easily exceed the rider's normal jogging speed. At higher speeds the rider typically leans forward into the torso brace and continuously pushes against it with sufficient force to drive the vehicle forward, which affords maximum control and safety. Maximum speed, which requires the trust from poling as well, can far exceed the rider's fastest running pace. Aside from thrust attributed to poling, the vehicle's speed is proportional to the length of a rider's stride and the force that is applied by the foot pushing against the ground, which is also true for a runner too. However the runner's stride is more limited than that of the rider, where the mechanical advantage of the vehicle can enable the rider to bound more effortlessly, and glide much further between each stride than on foot.

When riding Feet Up a rider can coast to reduce their speed, or use a brake such as the foot-actuated brake 28 described previously. Riding Feet Down, however, the rider is able to arrest their speed by slowing their pace just as one would when walking or running. A brake that is operable by a hand-lever 43, which can be attached to the torso brace for example, can also be used. In braking with a hand-lever, the pole is raised and held up by the hand while the hand operates said lever. The same hand-lever 43 can also be operated in the same way when riding Feet Up, making said foot-actuated brake unnecessary. It should be noted, a torso brace or the like can be made such that the rider can take control of it with their hand(s) while holding the pole(s), and thereby control the steering wheel to some degree, as one would with a handlebar in a bicycle or draisine.

Use of the poles 24 can be an integral part of the Foot Down operation of the vehicle. As noted, their utility in aiding the rider with the control of the vehicle can be a useful aspect in either mode of operation, though their affect does vary between the two, which is also the case with their use as a method of propulsion. In Feet Down riding, the coordinated movement of the poles with the feet can counterbalance the action of the lower limbs, which otherwise can have a tendency to disturb the balance of the vehicle: When the right-arm and left-leg, and the left-arm and right-leg, follow each other by moving in unison forward and backward—which is the same natural tendency of the arms to swing when walking or running—the same beneficial affect is also produced when propelling the vehicle in its Foot Down operation. In riding Feet Up there is no need to counterbalance the legs since the position of the lower limps is fixed. Consequently, there is more latitude in the movements of the upper limp when operating Feet Up, and hence more variation in poling technique is permitted.

It should be understood that the examples and embodiments described herein are for illustrative purposes only and that various modifications or changes in light thereof will be suggested to persons skilled in the art and are to be included within the spirit and purview of this application and the scope of the appended claims.

The invention claimed is:

1. A two-wheeled vehicle comprising:
a forward structural member supported by a front wheel rotatably mounted thereto, the forward structural member pivotally connected to a rearward structural member supported by a rear wheel rotatably mounted thereto, the front wheel and the rear wheel in tandem, the front wheel pivotable about a substantially vertical steering axis, the steering axis and a point of contact of the rear wheel with a ground defining a plane, a point of contact of the front wheel with the ground located rearward of a point at which the steering axis intersects the ground, the point of contact of the front wheel with the ground and the point of contact of the rear wheel with the ground defining a longitudinal axis;
a saddle mountable to the rearward structural member positioned forward of a rear wheel axle and aligned in the plane; and
a torso brace mountable to the forward structural member or the rearward structural member configured to be engaged by contact with a part of a body of a rider other than a limb, whereby a movement of the body of the rider against the torso brace causes the front wheel to pivot about the steering axis;
wherein the torso brace is configured to engage at least one side of the rider when the rider leans forward, and whereby through the movements of the engaged side of the rider, the front wheel pivots in a direction opposite to the engaged side of the rider; and
wherein the vehicle is configured to be propelled by feet of the rider pushing against the ground on opposite sides of the longitudinal axis.

2. The vehicle of claim 1, wherein said saddle includes sides that slope downward from a top thereof, said sides configured to contact inner thighs of the rider and resist a force applied therefrom, wherein the force enables the rotation of the rearward member about said point of contact of the rear wheel with the ground, and pivots the forward structural member about said point of contact of the front wheel with the ground in a direction corresponding to said force.

3. The vehicle of claim 1, wherein said torso brace is linked to said forward structural member whereby a degree of movement of the part of the body of the rider that engages the torso brace is a corresponding amount or a rate by which the forward structural member pivots the front wheel in response to said movement is fixed.

4. The vehicle of claim 1, further comprising a means mountable to said rearward structural member wherein said means is configured to hold mass of legs the rider above the ground, whereby the mass of each leg can be held in place on opposing sides of said plane.

5. The vehicle of claim 4, further comprising an additional means configured to be operable by at least one foot of the rider whereby a speed of the vehicle is arrested when activated.

6. The vehicle of claim 1, further comprising a brake to arrest at least one of said rear wheel or said front wheel, said brake actuated by a hand lever attached to said torso brace.

7. The vehicle of claim 1, further comprising an electric motor configured to drive said front wheel or said rear wheel.

8. The vehicle of claim 7, wherein controls of said motor are attached to said torso brace.

9. The vehicle of claim 1, further comprising footholds mountable to said forward structural member disposed on opposing sides of said front wheel and configured to support a weight of the feet and the legs of the rider forward of said steering axis.

10. The vehicle of claim 1, further comprising at least one accessory contact means mountable on at least one of said forward structural member or said rearward structural member.

11. The vehicle of claim 10, wherein said at least one accessory contact means is attached to said rearward structural member disposed on each side of said plane and configured to contact inner thighs or knees of the rider.

12. The vehicle of claim 11, wherein said at least one accessory contact means is created by elongating said saddle.

13. The vehicle of claim 1, further comprising at least one pole, wherein the vehicle is configured to be propelled by the at least one pole pushing against the ground.

14. A two-wheeled vehicle comprising:
a forward structural member supported by a front wheel rotatably mounted thereto, the forward structural member pivotally connected to a rearward structural member supported by a rear wheel rotatably mounted thereto, the front wheel and the rear wheel in tandem, the front wheel pivotable about a substantially vertical steering axis, the steering axis and a point of contact of the rear wheel with a ground defining a plane, a point of contact of the front wheel with the ground located rearward of a point at which the steering axis intersects the ground; and
a means attached to said rearward structural member configured to support a mass of a rider positioned with a center-of-mass of the rider located in said plane forward of said point of contact of the rear wheel with the ground and rearward of said steering axis, said means further configured to resist torsion applied about said center-of-mass in a plane substantially parallel to a surface of the ground, said torsion produced from a torque developed by feet of the rider pushing against the ground, whereby said torque tends to twist said rearward structural member with respect to the surface of the ground;
wherein said forward structural member responds to said torque by pivoting the front wheel about a point of contact with the ground in a direction corresponding to that of said torque.

15. The vehicle of claim 14, wherein said means is configured to resist torsion produced by a force created when at least one inner thigh of the rider pushes laterally against said means at a point forward of said point of contact of the rear wheel with the ground.

16. The vehicle of claim 14, wherein said means is configured to resist a force which is produced when said mass of the rider moves, said force having at least a component thereof: that is parallel or normal to the direction of travel, and substantially parallel to the surface of the ground.

17. The vehicle of claim 14, wherein a second center-of-mass forward of said steering axis is adjustable forward of said steering axis to tune the response of the vehicle to a change in a steering angle to that of a change in a tilt angle.

18. The vehicle of claim 14, wherein said front wheel is configured to include a supplementary mass evenly distributed about a front wheel axle as part of the a rim or a tire, increasing the gyroscopic effect of the rotating front wheel.

* * * * *